US011502485B2

(12) United States Patent
Holland-Moritz et al.

(10) Patent No.: US 11,502,485 B2
(45) Date of Patent: Nov. 15, 2022

(54) STRIPPING PLIERS

(71) Applicant: Rennsteig Werkzeuge GmbH, Steinbach-Hallenberg (DE)

(72) Inventors: Georg Holland-Moritz, Steinbach-Hallenberg (DE); Michael Brueckner, Steinbach-Hallenberg (DE); Ralf Legler, Altersbach (DE)

(73) Assignee: Rennsteig Werkzeuge GmbH, Steinbach-Hallenberg (DE)

( * ) Notice: Subject to any disclaimer, the term of this patent is extended or adjusted under 35 U.S.C. 154(b) by 307 days.

(21) Appl. No.: 16/760,095

(22) PCT Filed: Nov. 8, 2018

(86) PCT No.: PCT/EP2018/080610
§ 371 (c)(1),
(2) Date: Apr. 29, 2020

(87) PCT Pub. No.: WO2019/105708
PCT Pub. Date: Jun. 6, 2019

(65) Prior Publication Data
US 2020/0358269 A1    Nov. 12, 2020

(30) Foreign Application Priority Data

Nov. 29, 2017   (DE) ..................... 10 2017 128 228.9

(51) Int. Cl.
*H02G 1/12*    (2006.01)
(52) U.S. Cl.
CPC ......... *H02G 1/1212* (2013.01); *H02G 1/1236* (2013.01)

(58) Field of Classification Search
CPC .. H02G 1/1212; H02G 1/1236; H02G 1/1224; H02G 1/005; H02G 1/1241;
(Continued)

(56) References Cited

U.S. PATENT DOCUMENTS 3,161,087 A * 12/1964 Bartley ............... H02G 1/1212
7/107
3,596,541 A *  8/1971 Bieganski ........... H02G 1/1241
30/304

(Continued)

FOREIGN PATENT DOCUMENTS

DE        33 08 053 A1     9/1984
DE        44 20 006 C2     4/1998
(Continued)

OTHER PUBLICATIONS

International Search Report of PCT/EP2018/080468, dated Jun. 11, 2019.
(Continued)

*Primary Examiner* — Ghassem Alie
(74) *Attorney, Agent, or Firm* — Collard & Roe, P.C.

(57) ABSTRACT

Stripping pliers have two outer clamping jaws, two inner cutting jaws and two handle parts, wherein, in the course of pressing together the handle parts, the cutting jaws can be displaced from a starting position into an end position by a pull rod against the force of a spring acting on the pull rod. The pull rod is traversed by a pull pin which can move in a slot. In order to configure the stripping pliers such that they are further improved in a manner which is advantageous for handling, the pull rod has, at its handle-side end, a displacement part which is fastened to the pull rod and which is displaceable against the force of the spring relative to the pull rod, to free the pull rod from a handle-side mounting.

9 Claims, 25 Drawing Sheets

(58) Field of Classification Search
CPC .. H02G 1/1217; H02G 1/1231; H02G 1/1234; H02G 1/12; H02D 1/1204; B25B 27/466
USPC ......... 81/9.42, 9.4–9.44, 9.51; 30/90.1, 91.1, 30/91.2
See application file for complete search history.

(56) References Cited

U.S. PATENT DOCUMENTS

| | | | |
|---|---|---|---|
| 3,707,099 A * | 12/1972 | Petz | H02G 1/1212 81/9.43 |
| 3,879,981 A | 4/1975 | Richards | |
| 3,964,350 A * | 6/1976 | Casadio | H02G 1/1212 81/9.41 |
| 4,329,891 A * | 5/1982 | Bieganski | H02G 1/1212 81/9.43 |
| 4,485,696 A | 12/1984 | Bieganski | |
| 4,577,405 A | 3/1986 | Butler | |
| 4,768,404 A * | 9/1988 | Biegasnki | H02G 1/1212 81/9.43 |
| 5,724,870 A * | 3/1998 | Wiebe | H02G 1/1212 81/9.41 |
| 5,724,871 A | 3/1998 | Wall | |
| 6,094,821 A | 8/2000 | College et al. | |
| 7,513,177 B2 | 4/2009 | Hofmann et al. | |
| 7,841,260 B2 | 11/2010 | Storm et al. | |
| 2009/0126534 A1* | 5/2009 | Storm | H02G 1/1212 81/9.43 |
| 2010/0101379 A1 | 4/2010 | Hofmann et al. | |
| 2016/0226229 A1 | 8/2016 | Zinser | |

FOREIGN PATENT DOCUMENTS

| | | |
|---|---|---|
| DE | 100 06 509 A1 | 8/2000 |
| DE | 20 2008 014 111 U1 | 3/2009 |
| EP | 0 253 528 A2 | 1/1988 |
| EP | 0 645 861 A2 | 3/1995 |
| EP | 0 707 366 A2 | 4/1996 |
| EP | 0 989 652 A1 | 3/2000 |
| EP | 1 557 920 A2 | 7/2005 |
| EP | 3 054 541 A1 | 8/2016 |
| JP | 2008-167813 A | 7/2008 |
| WO | 2008/062375 A2 | 5/2008 |

OTHER PUBLICATIONS

International Search Report of PCT/EP2018/080610, dated Mar. 8, 2019.

International Search Report of PCT/EP2018/080587, dated Feb. 22, 2019.

* cited by examiner

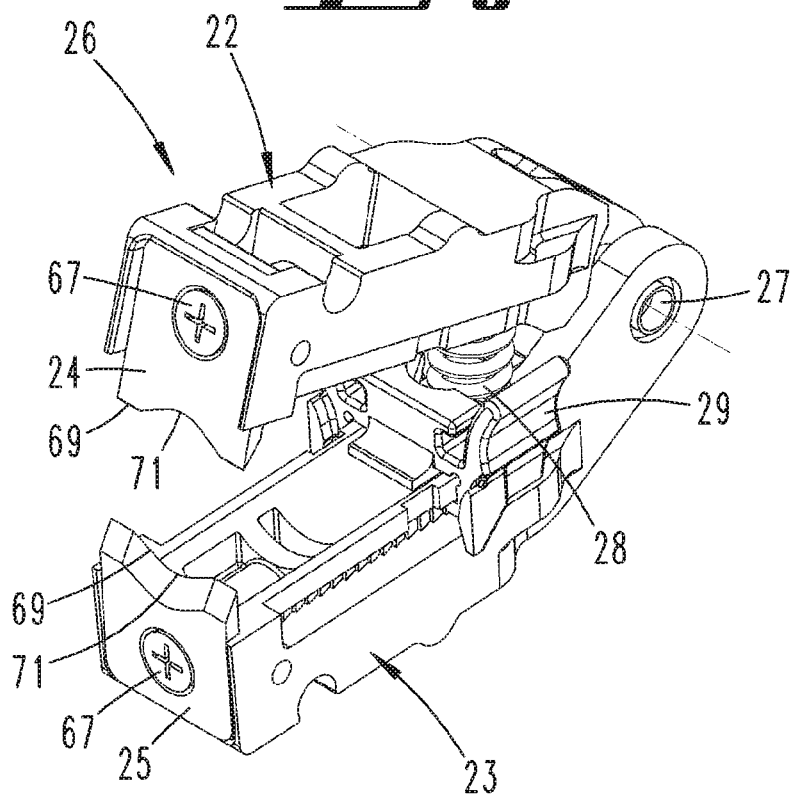
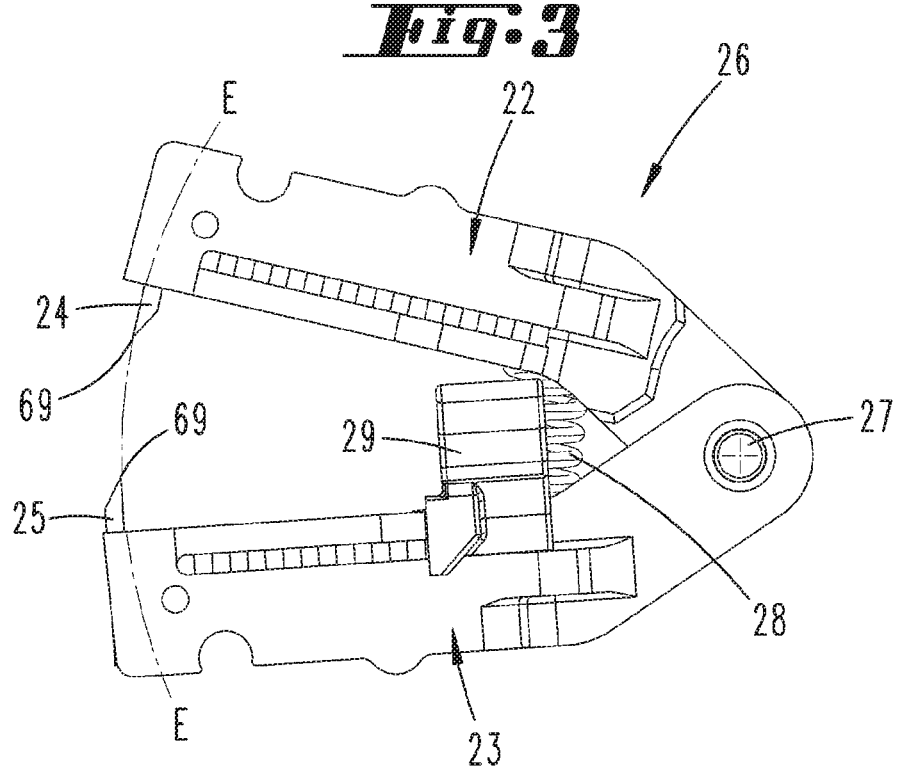

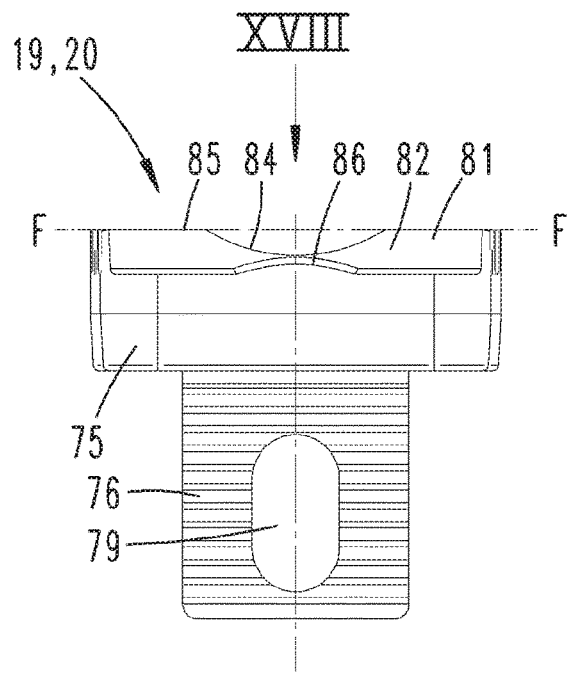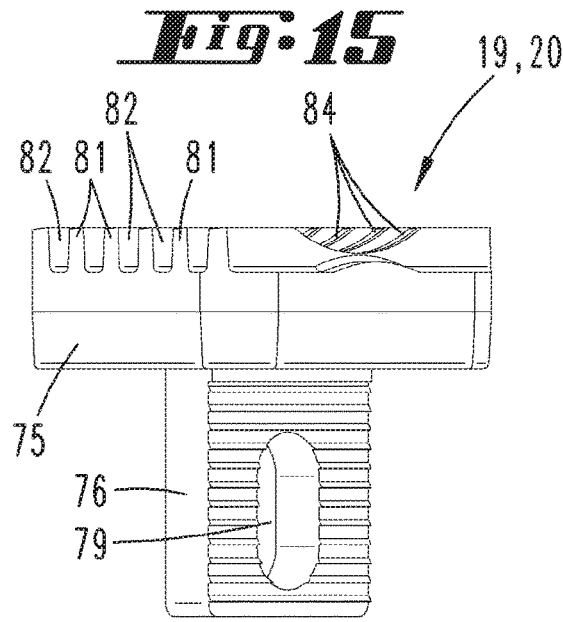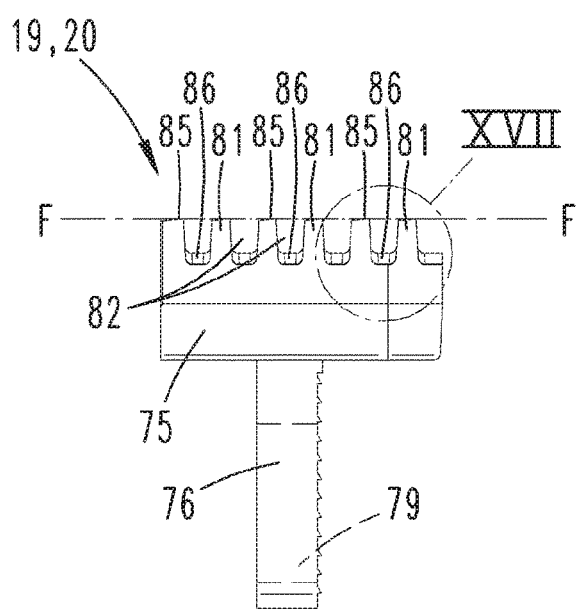

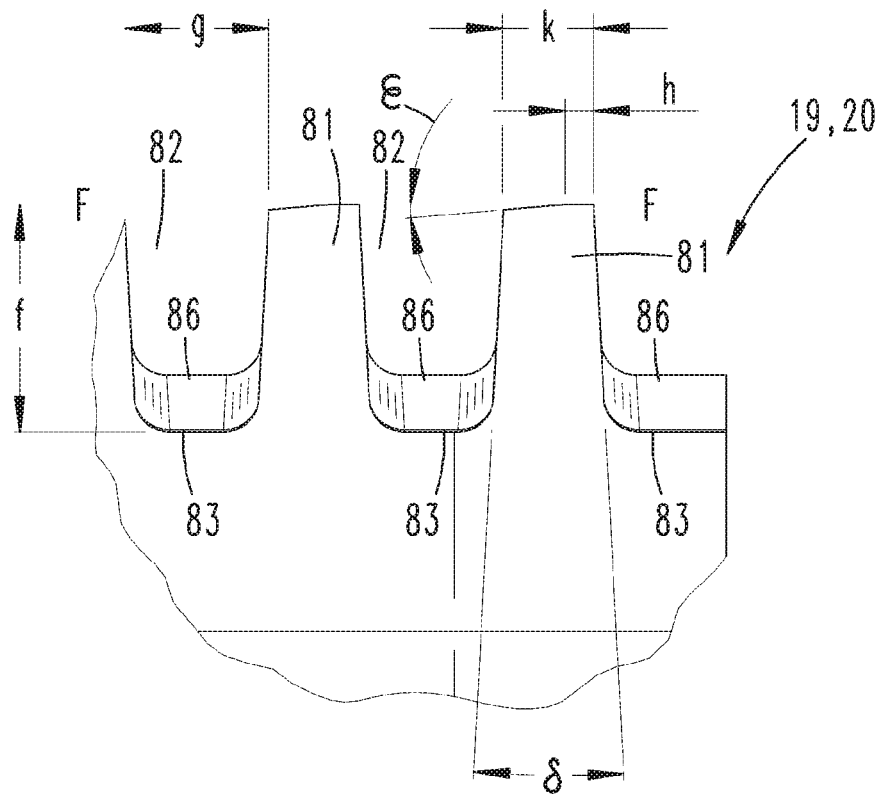
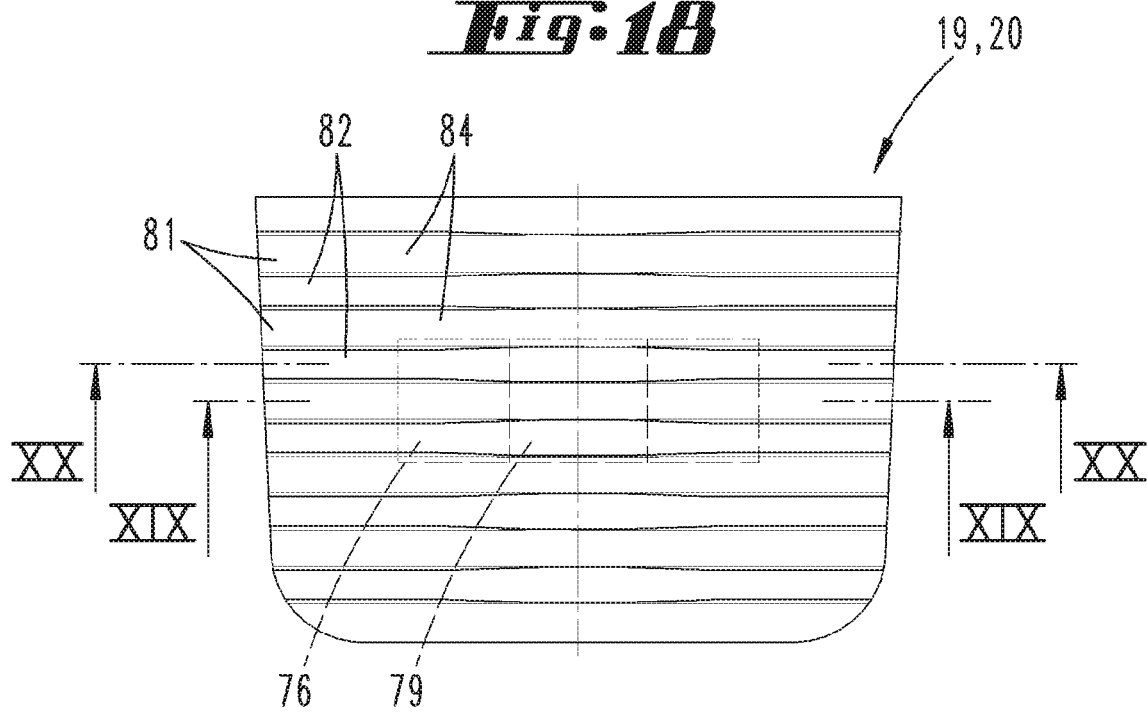

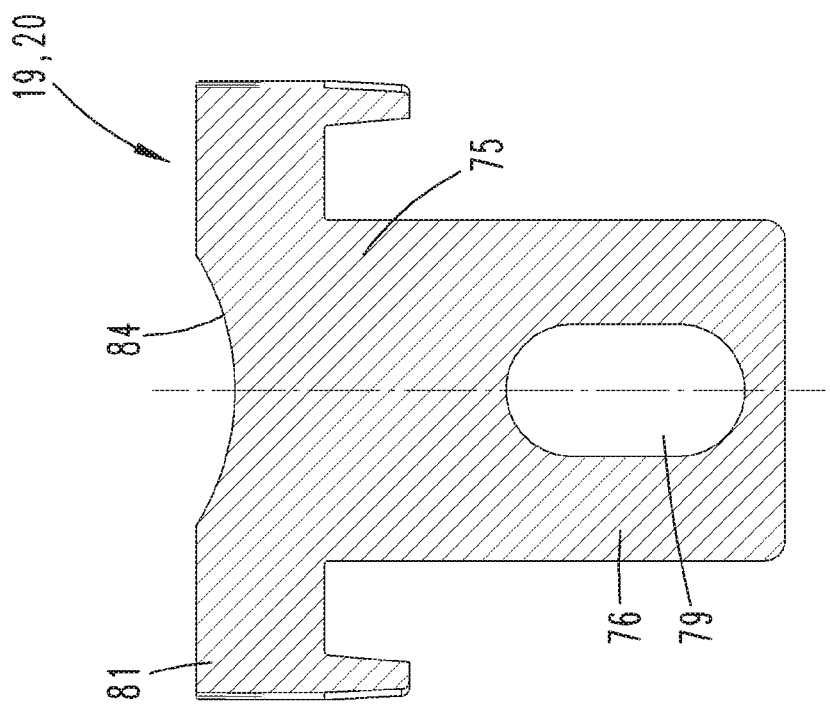
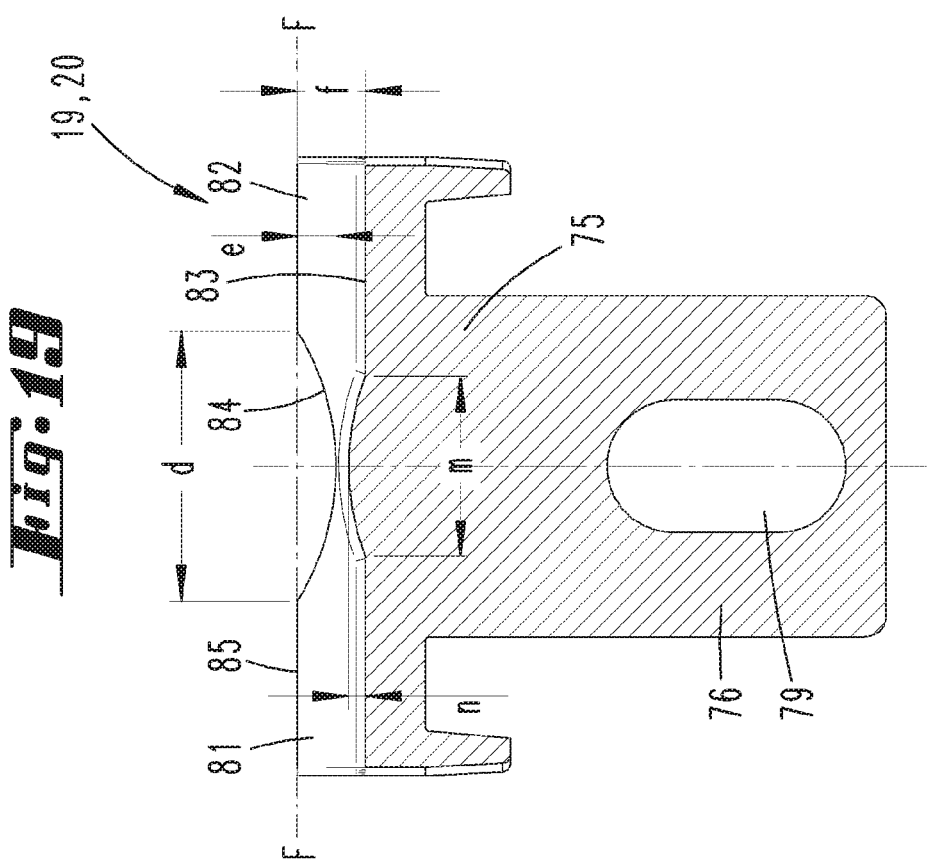

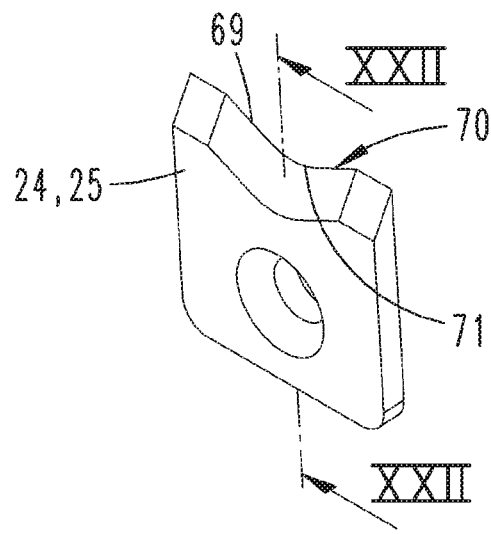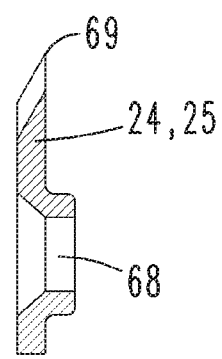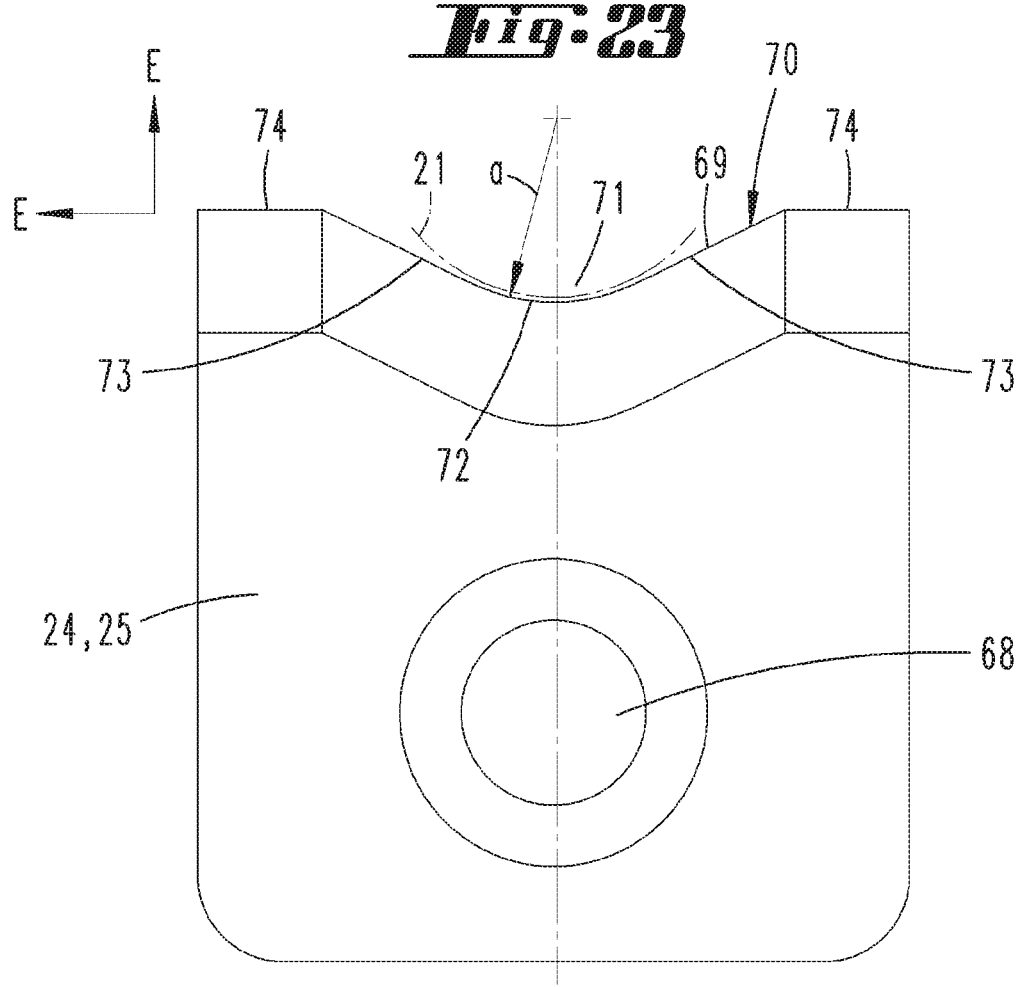

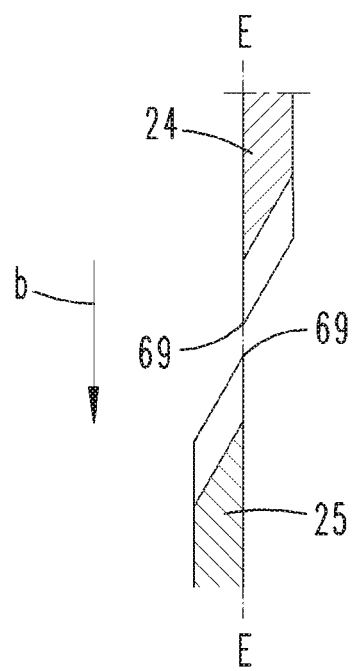

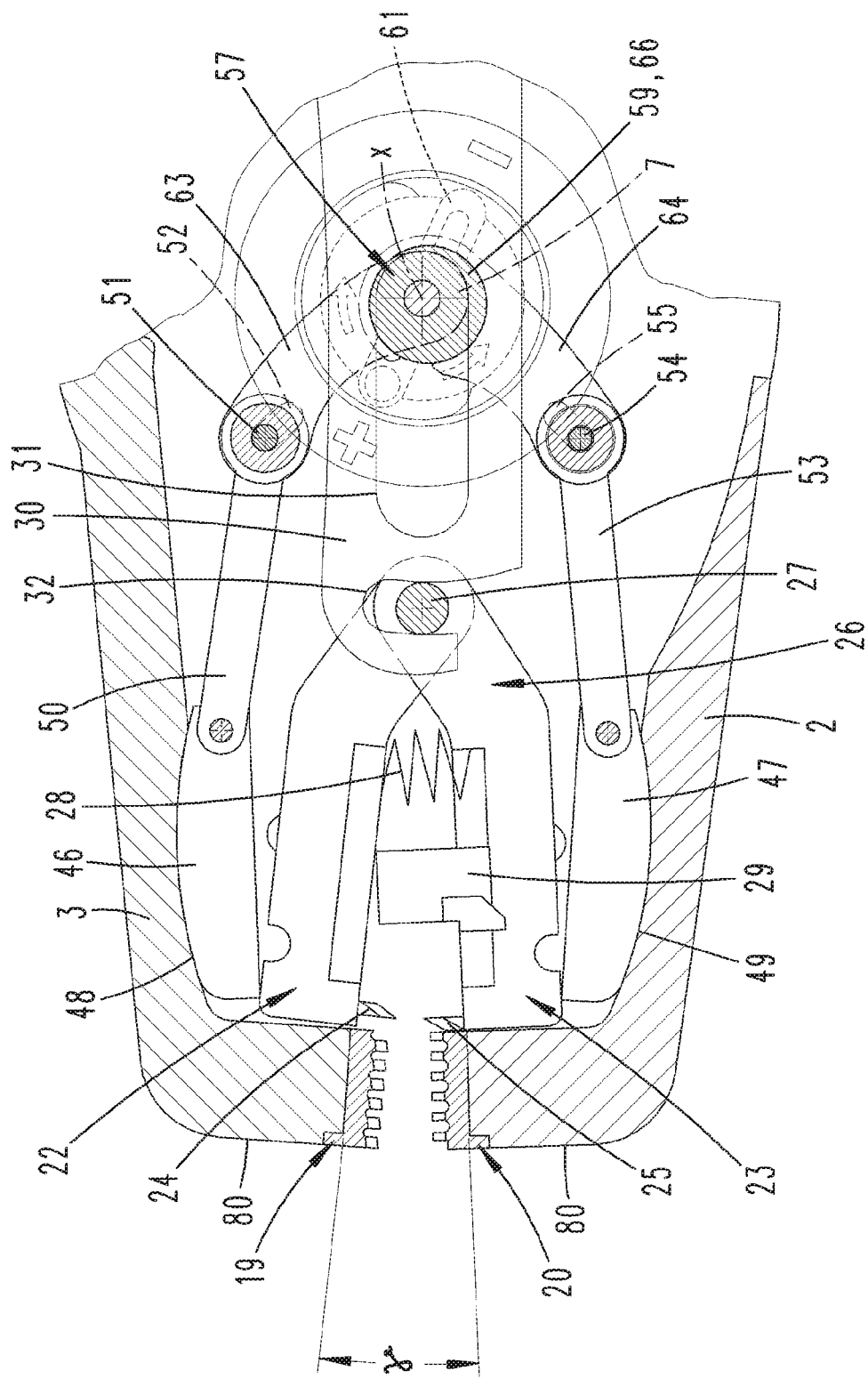

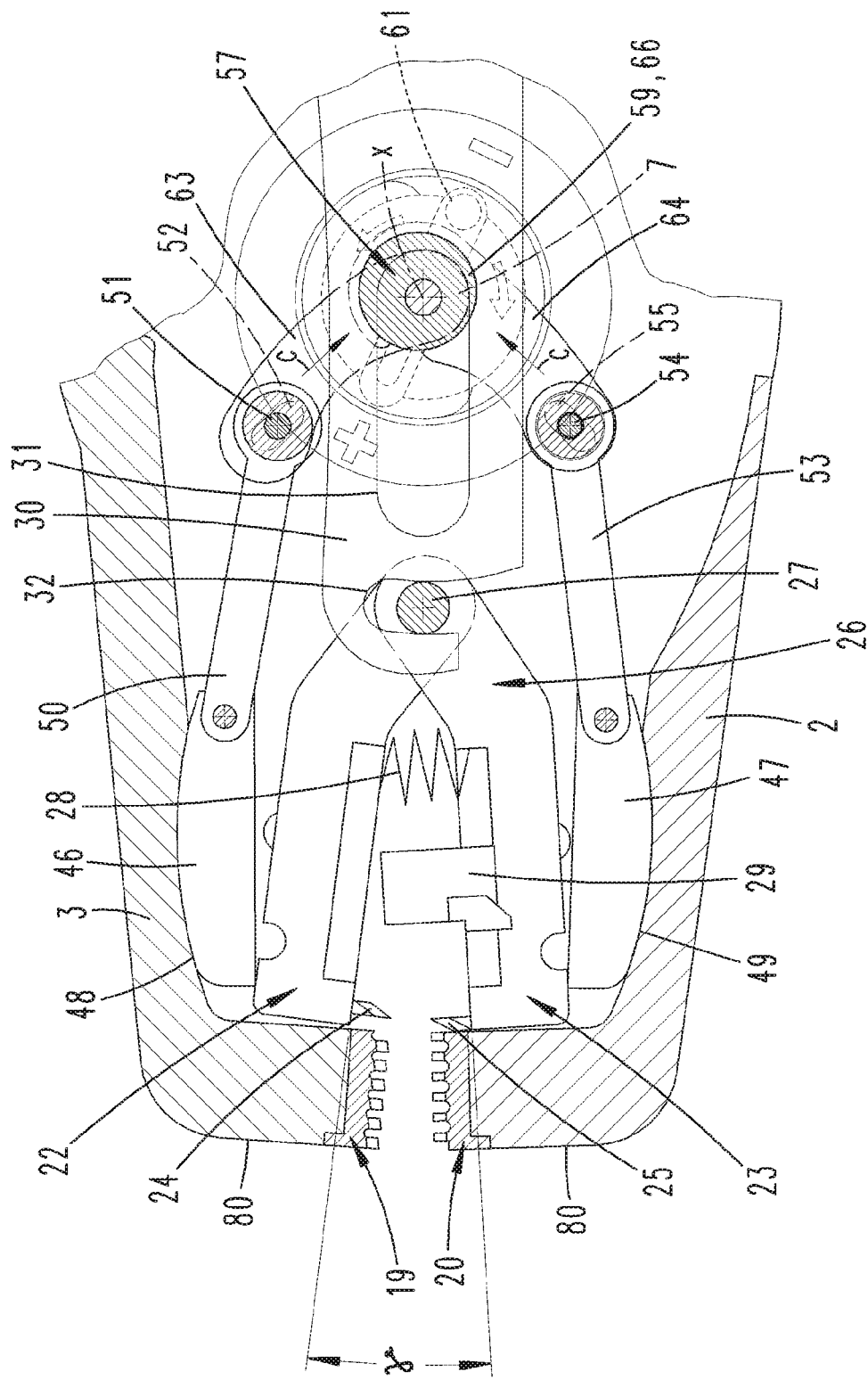

STRIPPING PLIERS

CROSS REFERENCE TO RELATED APPLICATIONS

This application is the National Stage of PCT/EP2018/080610 filed on Nov. 8, 2018, which claims priority under 35 U.S.C. § 119 of German Application No. 10 2017 128 228.9 filed on Nov. 29, 2017, the disclosure of which is incorporated by reference. The international application under PCT article 21(2) was not published in English.

FIELD OF TECHNOLOGY

The invention relates to stripping pliers having two outer clamping jaws, two inner cutting jaws and two handle parts, wherein, in the course of pressing together the handle parts, the cutting jaws can be displaced from a starting position into an end position against the force of a spring acting on the pull rod, wherein furthermore the pull rod is traversed by a pull pin which can be moved in a slot.

PRIOR ART

Stripping pliers of the type in question are known. Reference is made, for example, to DE 44 20 006 C2, furthermore to EP 1 557 920 B1 (U.S. Pat. No. 7,513,177 B2), further for example, to U.S. Pat. No. 5,724,871. Such pliers, also widely used as automatic stripping pliers, are used for stripping ends of conductors, wherein in the course of pressing together the handle parts of the stripping pliers, the cable to be stripped is clamped in the region of the outer clamping jaws whilst subsequently the cutting jaws cut through the insulation. In the course of the further pressing together of the handle parts, the separated insulating section is withdrawn from the conductor using the cutting jaws for the desired exposure of the conductor end.

SUMMARY OF THE INVENTION

With a view to the previously described prior art, an object of the invention is seen in particular in further improved configuring of insulating pliers of the type in question in a favourable manner for handling.

A possible solution of the object according to a first inventive idea is achieved in stripping pliers in which the focus is on the fact that at its handle-side end, the pull rod has a displacement part fastened to the pull rod, which can be displaced by the force of the spring relative to the pull rod, to free the pull rod from a handle-side mounting.

The provided spring can, as is also preferred, provide a restoring force (optionally additionally) which loads the pull rod into its basic position. The basic position is preferably the open position both of the clamping jaws and of the cutting jaws. Furthermore, at least one further spring can also be provided for restoring the stripping pliers into the basic position, in particular a further spring which preferably also acts on the lever mechanics of the handle parts and the clamping jaws.

There is the need to suspend the spring force acting on the pull rod as required. This is advantageously solved in terms of handling technique by the solution according to the invention. The relevant spring, which is usually supported in the region of one of the handle parts, can be freed from its handle-side mounting in a captive manner. Even after such a freeing, in a preferred configuration the spring is still held in a captive manner on the pull rod. This accordingly furthermore offers a favourable handling in relation to restoring the handle-side spring support of the pull rod.

The displacement part fastened to the pull rod provides the spring with the necessary support surface. In the usual usage position the force is led off via this support surface into the associated handle part.

Further features of the invention are explained hereinafter, also in the description of the figures, frequently in their preferred assignment to the subject matter of claim 1 or to features of further claims. However, they can also be of importance in an assignment to only individual features of claim 1 or the respective further claims or independently in each case.

Preferably the displacement part is configured as a sleeve.

Thus, according to a further preferred configuration, it can be provided that the pull rod freed from the handle-side mounting is pivotable about a pivot pin for release of the cutting jaws. As a result of the favourable suspension of the handle-side spring support of the pull rod in terms of handling technique, which has been made possible, this pull rod can at least be pivoted about the pull pin acting on the pull rod in the course of a stripping process, optionally in movement superposition with a linear displacement. In particular as a result of the pivoting of the freed pull rod which has been made possible, a release of the cutting jaws can be achieved, for example, in order to thereby achieve a favourable exchange of cutting jaws in terms of handling technique. As a result of the pivoting, the pull rod can be moved from a position which entrains the cutting jaws in the course of a pressing together of the handle parts into an alignment which does not displace the cutting jaws even when pressing together the handle parts and therefore usually accompanied by a sliding displacement of the pull rod.

Also a longitudinal direction of the slot through which the pull rod engages encloses an acute angle with a displacement direction of the pull rod during usual use. This acute angle can be up to, for example, 85°, so further for example 60 to 75°. From this slot alignment, a superposition of pivoting and linear movement of the pull rod to release the cutting jaws can also be achieved when the pull rod is freed.

The suspension of the handle-side mounting of the spring or the sleeve comprising the spring can preferably only be carried out deliberately. An orderly stripping process is ensured with the sleeve and the spring suitably held in the associated handle part.

In this context, it proves to be advantageous if the displacement part, i.e. for example, the sleeve, for the handle-side mounting of the pull rod has a latching projection for engagement in a latching recess formed on the handle part. As a result of the displacement of the displacement part contrary to the force of the spring acting on this, the latching projection can be displacement from the latching position with the handle-side latching recess. The operating position can accordingly preferably be positively secured.

The pull rod can also have a further slot assigned to its handle-side end, which is traversed by a retainer part of the displacement part. The retainer part can be configured to be pin- or stud-like, further for example, anchored in the sleeve wall. The pull rod engages with its section having this further slot into the displacement part. As a result, in a preferred embodiment the displacement part is thereby held in a captive manner on the pull rod, enabling a relative displacement of the displacement part to the pull rod achieved substantially in the direction of extension of the pull rod or in the direction of extension of the displacement part.

In one possible configuration, the spring can be supported on the one hand on the pull rod and on the other hand on the displacement part. The spring can, as is also preferred, be a cylinder compression spring. This can comprise the pull rod inside the displacement part.

In order to provide a favourable change of the cutting jaws in terms of handling technique, the pull rod assigned to the cutting jaws can have an insertion opening for a pivot pin of the cutting jaws which runs substantially in the closing or opening direction of the cutting jaws. As a result of this configuration, a release position of the cutting jaws relative to the pull rod can be achieved merely as a result of the pivoting displacement of the pull rod made possible after freeing the pull rod from the handle-side mounting. The relevant pull rod section, for example, such an end region of the pull rod can accordingly have a slot-shaped insertion opening for capturing the pivot pin of the cutting jaws in the course of restoring the usual usage position of the pull rod. The suspension and relocation of the assignment position of pull rod and cutting jaws can thus accordingly be achieved independently in the course of freeing the pull rod from the handle-side mounting and subsequent pivoting or in the course of restoring the operating position.

BRIEF DESCRIPTION OF THE DRAWINGS

The invention is explained in detail with reference to the appended drawing which however only shows one exemplary embodiment. In the drawing:

FIG. 2 shows a pair of cutting jaws in a perspective individual diagram;

FIG. 3 shows the pair of cutting jaws in side view;

FIG. 14 shows a clamping jaw of the stripping pliers in front view;

FIG. 15 shows the clamping jaw in a further view;

FIG. 16 shows the clamping jaw in side view;

FIG. 17 shows the enlargement of the region XVII in FIG. 16;

FIG. 18 shows the plan view of the clamping jaw according to arrow XVIII in FIG. 14;

FIG. 19 shows the section according to the line XIX-XIX in FIG. 18;

FIG. 20 shows the section according to the line XX-XX in FIG. 18;

FIG. 21 shows a blade of a cutting jaw in a perspective individual diagram;

FIG. 22 shows the section according to the line XXII-XXII in FIG. 21 through the blade;

FIG. 23 shows the blade in an enlarged side view;

FIG. 24 shows an enlarged schematic sectional diagram of the arrangement of both blades of the pair of cutting jaws;

FIG. 35 shows a schematic sectional diagram of the region XXXV in FIG. 7;

FIG. 36 shows a diagram corresponding to FIG. 35 but after a manual cutting depth adjustment by means of the adjusting means arrangement.

Figure 1:
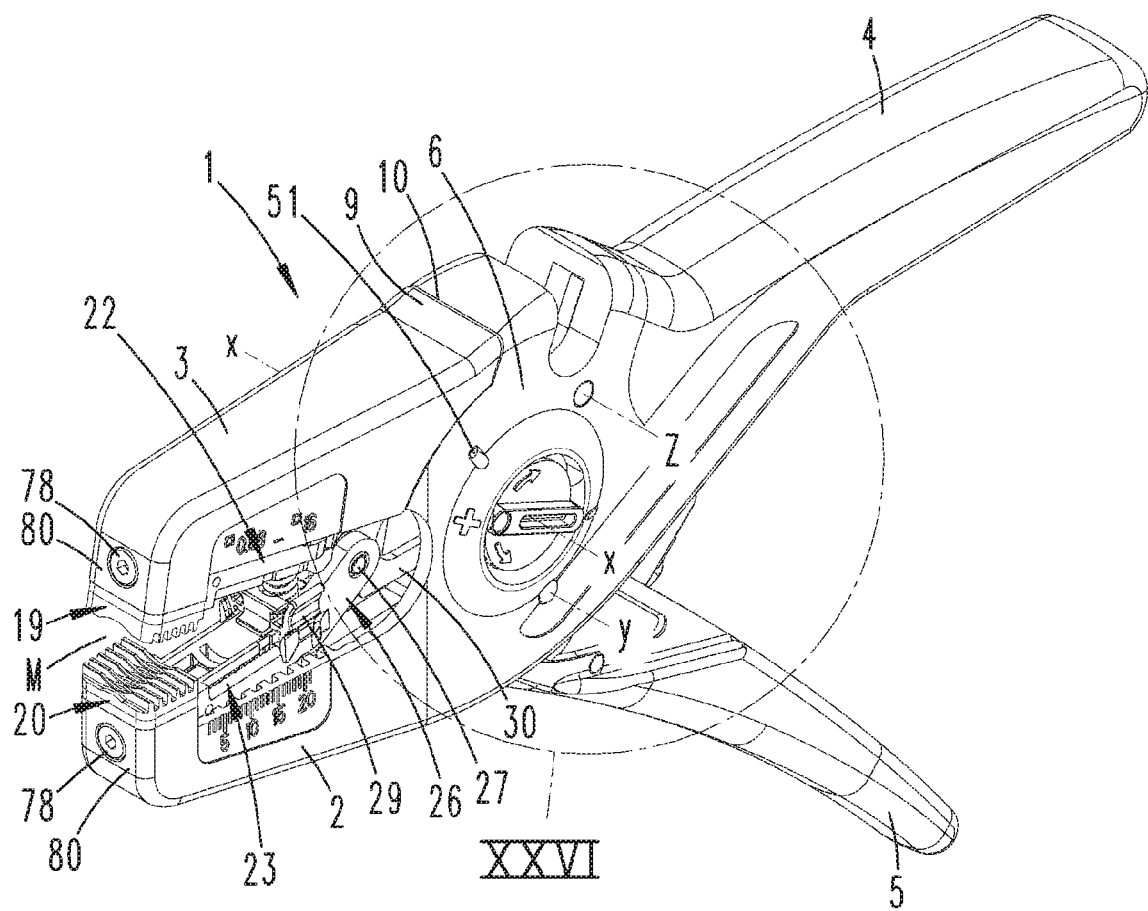
FIG. 1 shows stripping pliers in perspective view.
Figure 4:
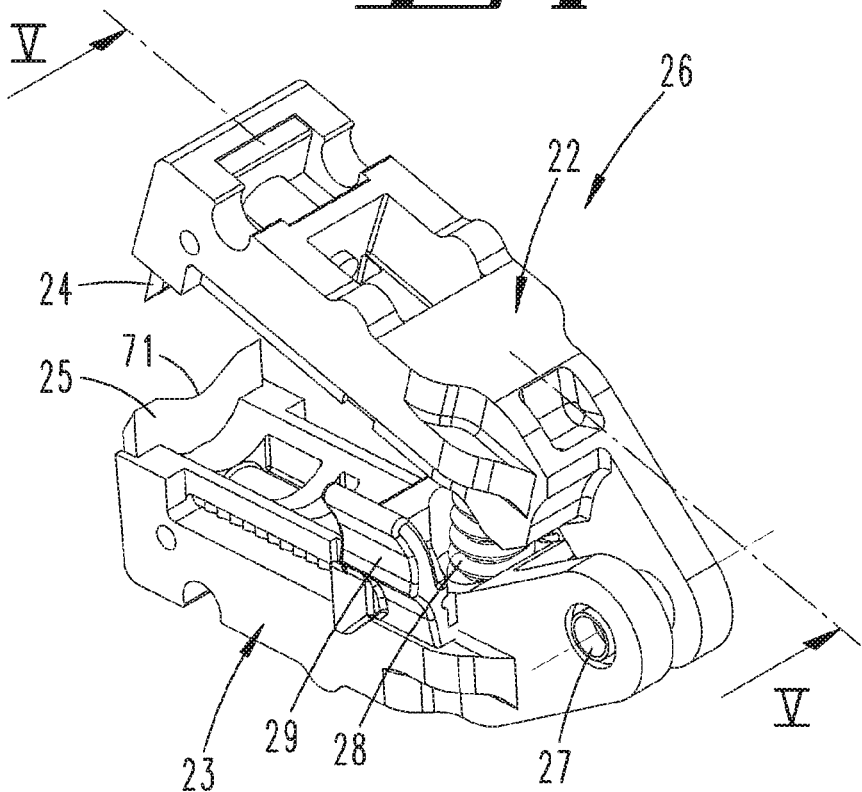
FIG. 4 shows a further perspective diagram of the pair of cutting jaws.
Figure 5:
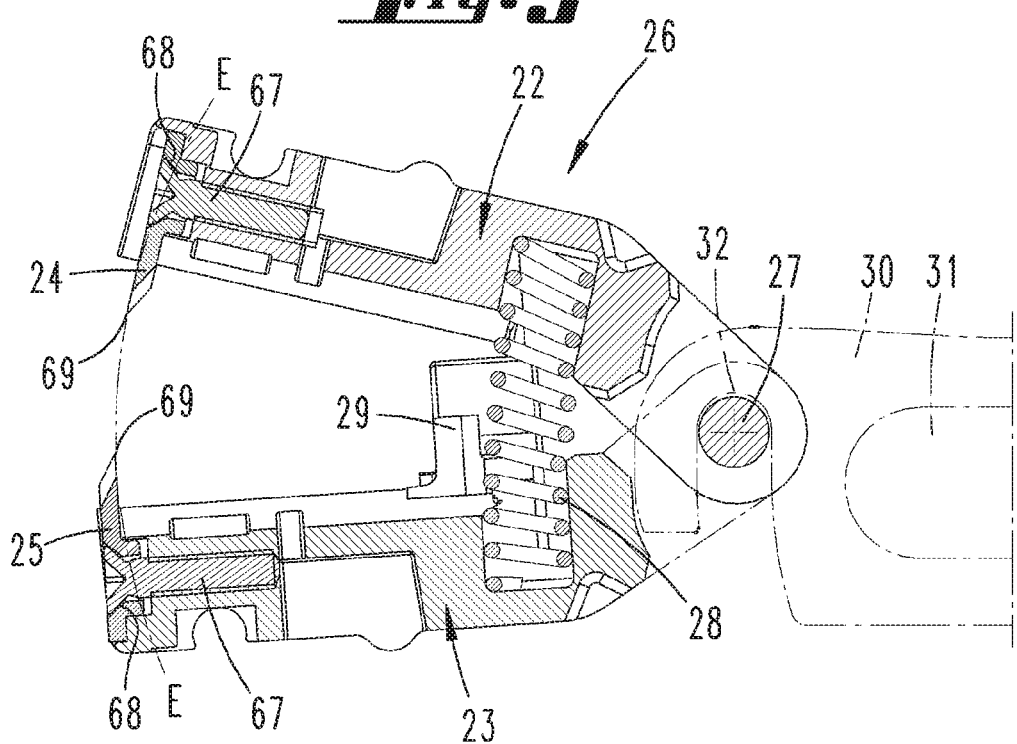
FIG. 5 shows the section along the line V-V in FIG. 4.

Shown and described, initially with reference to FIG. 1, is stripping pliers 1 with two plier jaws 2, 3 and two handle parts 4, 5. The plier jaws 2 and 3 delimit a pliers mouth M.

The plier jaw 2, which is hereinafter designated as fixed, is connected via a cheek region 6 directly and firmly to the handle part 4.

In the cheek region 6 the stripping pliers 1 provide a mounting for an axis of rotation 7 with a geometrical axis x about which the plier jaw 3 which can be moved further hereinafter is rotatably held.

The mounting of the movable plier jaw 3 on the axis of rotation 7 is obtained in the region of an extending shoulder region 8 of the movable plier jaw 3 extending in the direction of extension of the axis x in projection to the cheek region 6 of the fixed plier jaw 3.

Figure 6:
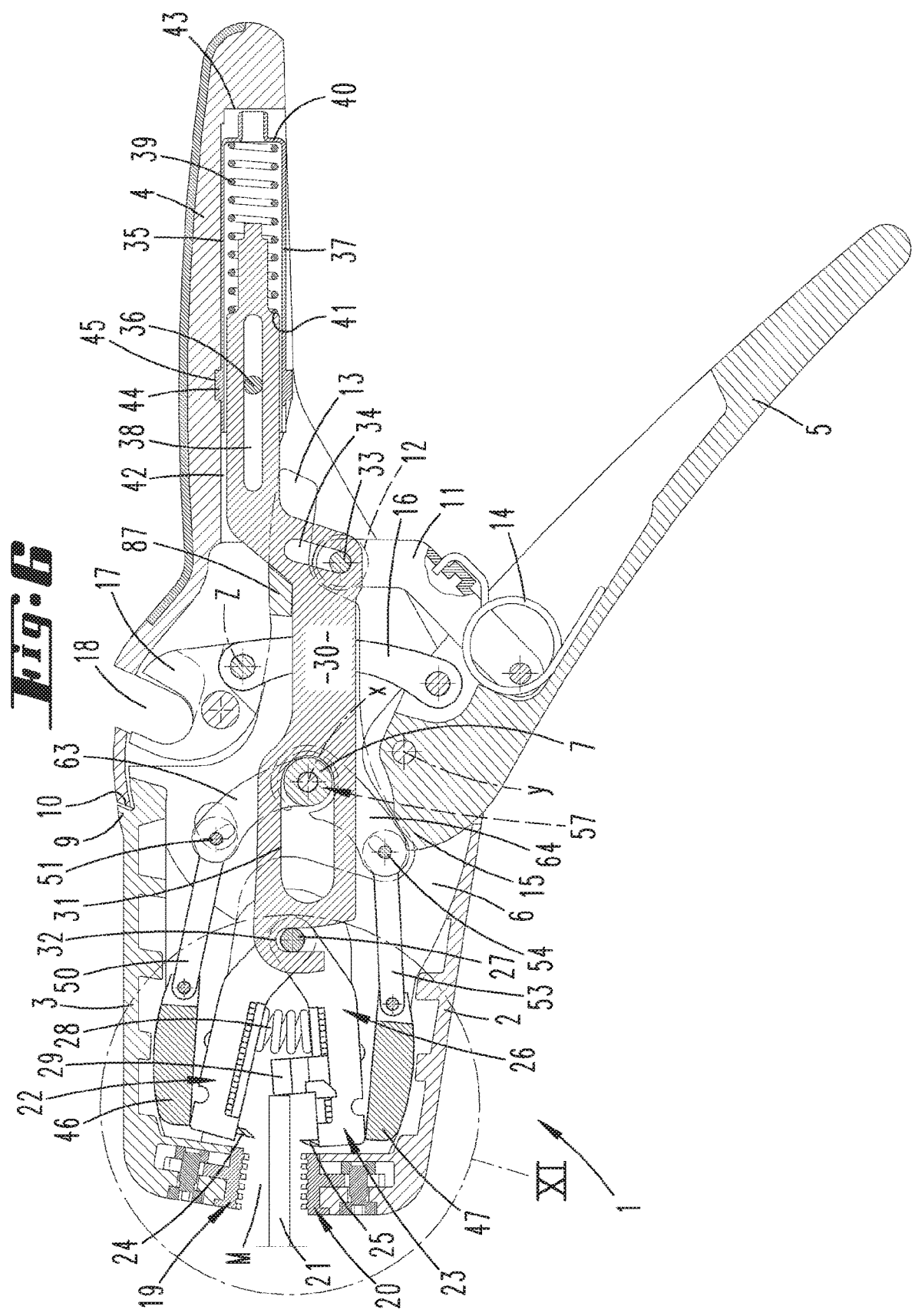
FIG. 6 shows a longitudinal sectional diagram through the stripping pliers, relating to an unactuated basic position.

The pliers mouth open position, for example, according to the diagram in FIG. 6 is stop-delimited as a result of support of a projection region 9 on the movable plier jaw 3 on an associated support surface 10 of the fixed plier jaw 2.

The further handle part 5 is pivotably mounted about a further geometric axis y aligned parallel to the axis of rotation 7 or the geometric axis x thereof. The relevant physical axis is likewise held in the cheek region 6 of the fixed plier jaw 2 or the fixed handle part 4.

The movable handle part 5 is pivotable about the axis y in the direction of the fixed handle part 4, wherein a pivotable displacement of the movable handle part 5 in the direction of the fixed handle part 4 brings about a coupled rotational movement of the movable plier jaw 3 about the axis x.

For this purpose, a control lever 11 preferably running at an angle, is fastened to the movable handle part 5, which control lever acts with its free end, in the exemplary embodiment shown with a roller 12 preferably arranged in this region, on a side arm 13 of the shoulder region 8 of the movable plier jaw 3, which is configured for example in the manner of a linkage.

The control lever 11 is held pivotably movably on the movable handle part 5. The relevant pivot axis preferably runs parallel to the geometric axis of rotation x.

A return spring 14 preferably in the form of a leg spring acts between the control lever 11 and the movable handle part 5. This loads the movable handle part 5 in the direction of the basic position shown in FIG. 6.

In this basic position a projection region 15 extending with reference to the geometric axis y of the movable handle part 5 facing away from the handle region acts on the shoulder region 8 of the movable plier jaw 3 such that this is urged and held in its stop-limited position.

Furthermore, the movable handle part 5 acts via a guide 16 on a pivotably mounted blade 17 in the cheek region 16 if the fixed plier jaw 2. The mounting of the blade 17 is accomplished in the cheek region 6, wherein the relevant geometric axis z also runs parallel to the geometric axis of rotation x of the movable plier jaw 3.

The blade 17 lies free in a free-cut region 18 of the fixed plier jaw 3 or of the cheek region 6 and preferably serves to cut to length a cable, for example a cable to be stripped in a further step.

Due to the pivoting movement of the blade 17 in the course of the pivoting displacement of the movable handle part 5 in the direction of the fixed handle part 4, a cable optionally lying in the region 18 supporting the cable at the flanks of the cheek region 6, which delimit the region 18, is cut through by the pivoting blade 17.

The two plier jaws 2 and 3 each have an outer clamping jaw 19, 20 for the clamping gripping of a cable 21 inserted in the pliers mouth M for stripping a free end, compare also FIGS. 13 to 16.

Furthermore, two inner cutting jaws 22, 23 with reference to the arrangement of the clamping jaws 19, 20 relative to the geometric axis of rotation x are provided, in each case blades 24, 25 fixed in the end region facing the clamping jaws 19 and 20. The blades 24 and 25 are arranged so that they point towards one another.

The cutting jaws 22 and 23, for which reference is also made in further detail to FIGS. 2 to 5, are combined to form a cutting jaw pair 26 and connected to one another in the region of the ends facing away from the blades 24 and 25, via a pivot axis 27, which pivot axis 27 allows a relative pivotability of the cutting jaws 22 and 23 with respect to one another.

The geometric axis of the pivot axis 27 preferably extends in the ready-to-operate arrangement of the cutting jaw pair 26 in parallel alignment to the axis of rotation x of the movable plier jaw 3.

Arranged between the cutting jaws 22 and 23 is a spring 28, in the depicted exemplary embodiment in the form of a cylinder compression spring, which spring 28 loads the cutting jaws 22 and 23 into an open position at a distance from one another.

In the depicted exemplary embodiment, on the lower cutting jaw 23, i.e. on the cutting jaw 22 assigned to the fixed plier jaw 2, a stop slide 29 which can be fixed in a latched position in the direction of extension of the cutting jaw 22 is provided to provide a stop for the free end of the cable 21 inserted into the pliers mouth M in order to thereby define the length of the region to be stripped.

Figure 12:
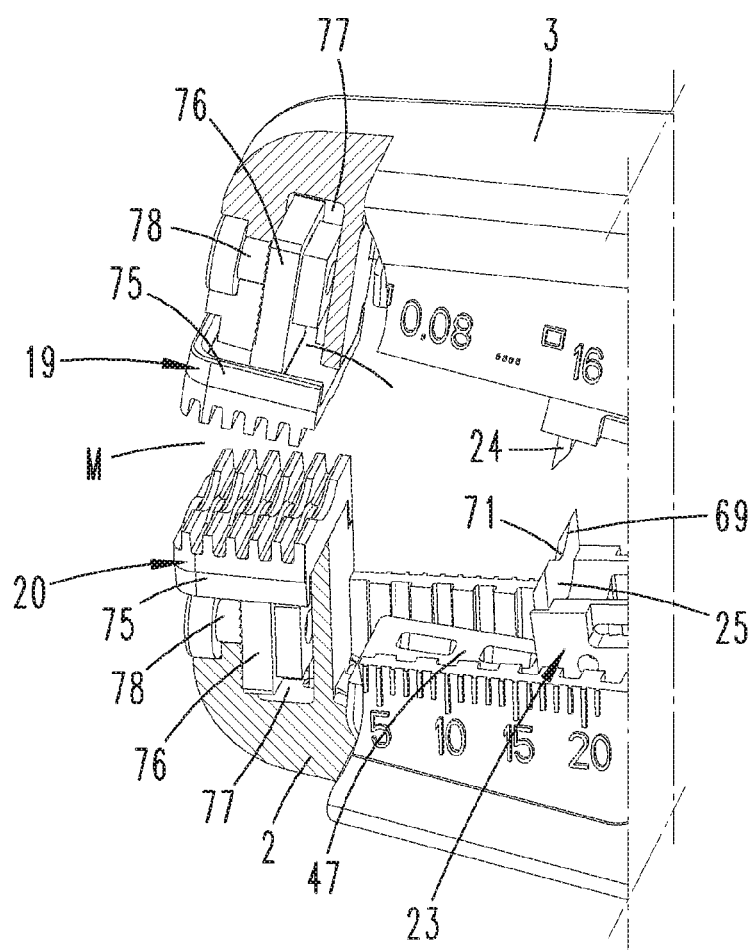
FIG. 12 shows the region shown in FIG. 11 in a partially cutaway perspective diagram.
Figure 13:
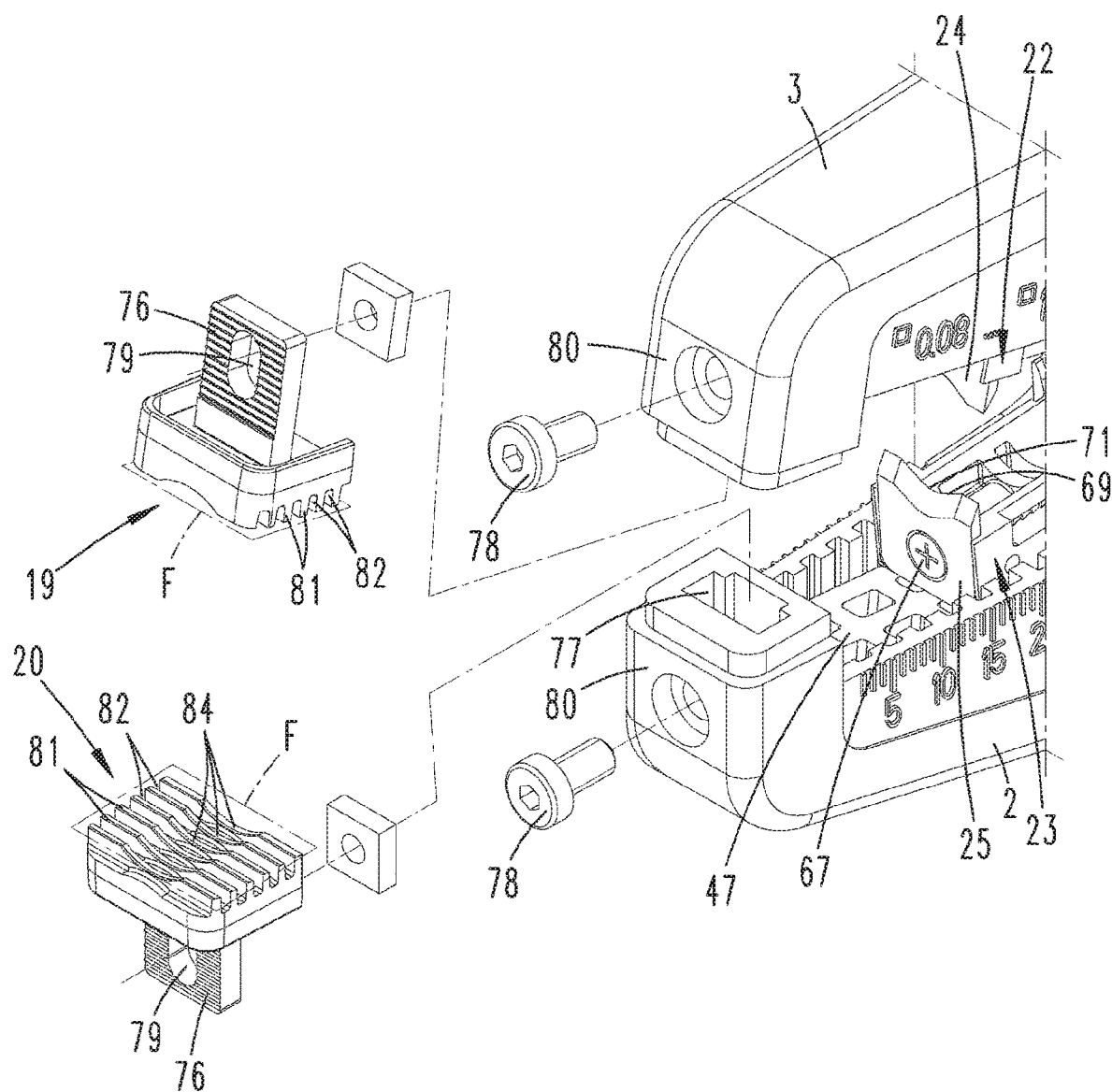
FIG. 13 shows a further perspective exploded diagram of the region shown in FIGS. 11 and 12.

The cutting jaws 22 and 23 are guided laterally in the respectively assigned plier jaw 2, 3, compare also FIGS. 12 and 13, to enable an orderly sliding displacement of the cutting jaw 22 and 23 in the direction of its longitudinal extension, i.e. starting from an initial position assigned to the clamping jaws 19 and 20 in the direction of an end position which is spaced apart in the direction of one of the clamping jaws 19 and 20 and displaced in the direction of the axis of rotation x and from this end position back again into the starting position.

A pull rod 30 is provided for this displacement of the cutting jaws 22, 23, preferably of the cutting jaw pair 26 overall. In the course of the pressing together of the handle parts 4, 5 against the force of a spring 39 acting on the pull rod 30, the cutting jaws 22, 23 can be displaced from a starting position into an end position. To this end, the pull rod 30 is further preferably traversed by a pull pin 33 which is movable in a slot 34, for example. The pull rod 30 furthermore preferably has a displacement part fastened on the pull rod 30 on its handle-side end. The displacement part can be displaced against the force of the spring 39 relative to the pull rod 30 to free the pull rod 30 on a handle-side mounting.

The displacement part can in particular be configured as a sleeve 35.

If the pull rod 30 is freed on the handle-side mounting, the pull rod 30 can be pivotable about the pull pin 33. As a result of a corresponding pivoting, the cutting jaws 22, 23 are released from the pull rod 30.

The pull rod 30 is also guided through the physical axis of rotation 7 whilst traversing a pull-rod-side slot-like recess 31.

Assigned to the pivot axis 27 of the cutting jaw pair 26, the pull rod 30 has an insertion opening 32 directed substantially in the direction of the fixed plier jaw 2, furthermore substantially in the closing or opening direction of the cutting jaws 22 and 23. This is created by an overall hook-like configuration of the relevant end region of the pull rod 30.

In the usual usage position of the stripping pliers 1 the pivot axis 27 of the cutting jaw pair 26 lies in this insertion opening 32 so that a sliding movement of the pull rod 30 made possible as a result of the slot-like configuration of the recess 31 leads to a corresponding sliding displacement of the cutting jaw pair 26.

This sliding displacement of the pull rod 30 is made possible via a coupling to the control lever 11 held on the movable handle part 5, which control lever 11 engages with a pull pin 33 aligned parallel to the axis of rotation 7, which in the depicted exemplary embodiment can at the same time form the axis for the roller 12, in a pull-rod-side slot 34. A central longitudinal line of the slot 34 encloses an acute angle $\alpha$ of about 60 to 85° C., further for example, about 75° with respect to a direction of displacement r of the pull rod 30.

A section of the pull rod 30 bent with respect to the region guided in particular in the region of the axis of rotation 7 and the pull pin 33 runs optionally inside the fixed handle part 4, in any case in assignment to this, in the usual usage position of the stripping pliers 1.

In the region of the handle-side end the pull rod 30 is embraced by the said sleeve 35. This is preferably held in a captive manner on the pull rod 30, this enabling a sliding displaceability of the sleeve 35 relative to the pull rod 30. This is made possible as a result of a pin-like retainer part 36 which traverses the sleeve cross-section whilst in each case fixing, at the end, the pin-shaped retainer part 36 in the region of the sleeve wall 37. The pin-shaped retainer part 36 in this case traverses the pull rod 30 received in the sleeve on the side of the end region in the region of a further slot 38.

Inside the sleeve 35 the spring 39 is arranged in the form of a cylinder compression spring which is supported at one end at the base 40 of the sleeve 35 and at the other end on a shoulder 41 of the pull rod 30 facing the base 40. Accordingly a relative displacement of pull rod 30 and sleeve 35 in the direction of the sleeve longitudinal axis is made possible against the force of the spring 39.

In the depicted exemplary embodiment, the sleeve 35 is received together with the associated end region of the pull rod 30 in a cavity 42 on the handle inner side, wherein in the ready-to-operate state of the stripping pliers 1 the sleeve 35 can be supported on a cavity base 43 via a pin-shaped extension projecting over the base 40.

Furthermore, the sleeve 35 has a latching projection for engaging in a latching recess 45 formed on the handle part 4, in particular in the region of the cavity 42.

Figure 10:
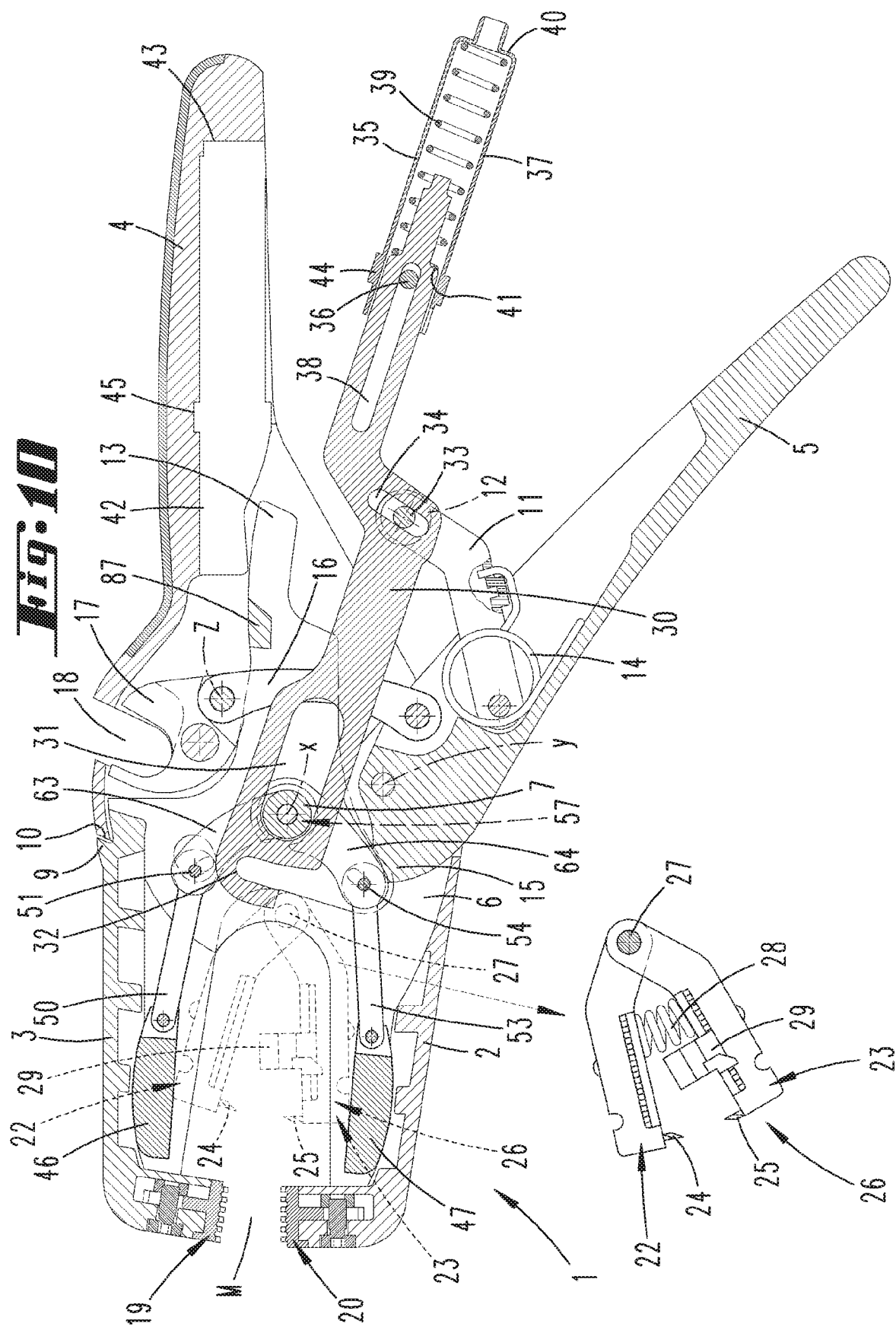
FIG. 10 shows a longitudinal sectional diagram of the stripping pliers substantially corresponding to FIG. 7 relating to an unlocking position of a pull rod to enable a change of the pair of cutting jaws.

As a result of the previously described arrangement and configuration of the spring-mounted sleeve 35, the pull rod 30 can be freed from the mounting on the handle part side (compare FIG. 10). After this, as has already been described further above, the pull rod 30 can be pivoted about the axis of rotation 7 which is additionally also made possible by the pull pin 33 guided in the slot 34 of the pull rod 30. As a result of this pivoting displacement of the pull rod 30 in the direction of the movable handle part 5, an upward pivoting of the free end of the pull rod having the insertion opening 32 is brought about to release the pivot axis 27 of the cutting jaw pair 26. Furthermore, optionally superposed on the upward-pivoting movement of the pull rod 30, a linear movement guided by the axis of rotation 7 engaging in the slot-like recess 31 can be achieved. In this case, the control lever 11 entrained via the pull pin 33 is pivotably displaced contrary to the force of the return spring 14.

In the upwardly pivoted and optionally slidingly displaced position of the pull rod 30 according to the diagram in FIG. 10, a removal of the cutting jaw pair 26 in a favourable manner in terms of handling technique, can be accomplished whilst carrying out a pivoting movement of the cutting jaws 22 and 23 in the direction of a closing position against the spring 28 loading the cutting jaws 22 and 23.

Even after a re-insertion of the cutting jaw pair 26 the correct operating position of the stripping pliers 1 can be adopted in a favourable manner in terms of handling technique and in a tool-less manner.

The cutting jaws 22 and 23 are movable towards one another in the direction of a closing position against a spring 28 loading the cutting jaws 22 and 23 into an open position shown, for example, in FIG. 6 whilst bringing together the handle legs 4 and 5.

The cutting jaws 22 and 23 are furthermore removable combined as a pair, for exchange. In further detail, the cutting jaws 23 and 23 are connected pivotably to one another via a pivot axis 27 which is preferably also configured as an axle pin.

Each cutting jaw 22, 23 is supported in the assigned plier jaw 2, 3 via a linkage part 46, 47, which linkage part 46, 47 is in turn supported on a clamping-jaw fixed linkage 48, 49.

This indirect support of the cutting jaws 22 and 23 on the respective plier jaw 2, 3 is also known from the initially mentioned EP 1 557 920 B1. Reference is also made to the content of this patent specification with regard to the mode of operation.

The sliding-wedge-like linkage part 46 or 47 is suitable for displacement along the linkage 48 or 49 configured on the jaw side as a type of sliding wedge surface. The radii of the cooperating surfaces of linkage part 46, 47 and linkage 48, 49 are matched to one another. Overall a sliding displaceability of the linkage parts 46 and 47 substantially in the direction of displacement r of the pull rod 30 and the cutting jaw pair 26 is given.

The linkage part 46 guided in the movable plier jaw is preferably connected via a coupling rod 50 to the cheek region 6 of the fixed plier jaw 3 or of the fixed handle part 4, this via a first axis 51 provided at the end of the coupling rod 50, which is guided in the cheek region 6 in a first slot 52.

The linkage part 47 guided in the fixed plier jaw 2 can also have a coupling rod 53 which can carry a second axis 54 at the end, for engagement in a second slot 55 provided in the shoulder region 8 of the movable plier jaw 3.

Figure 25:
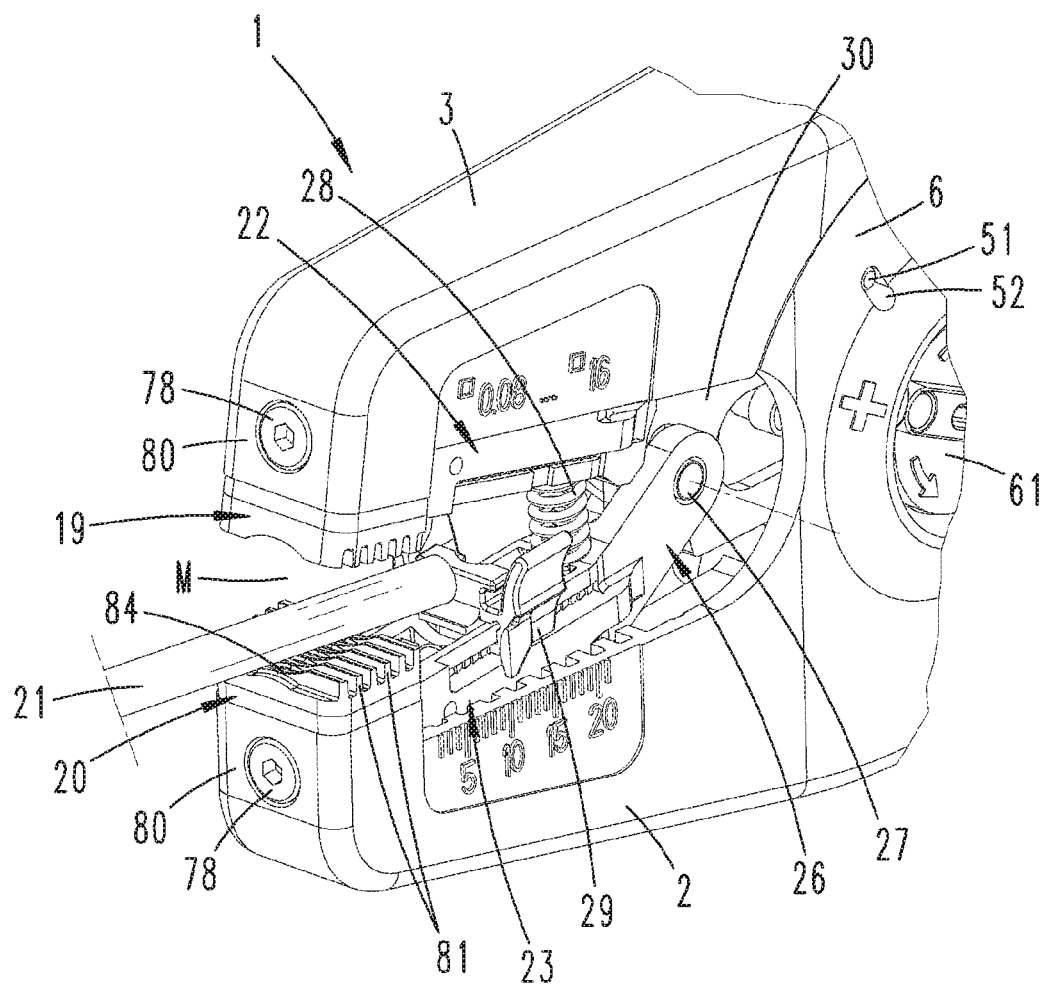
FIG. 25 shows a perspective diagram of the pliers mouth region with cable to be stripped inserted between the clamping jaws.
Figure 27:
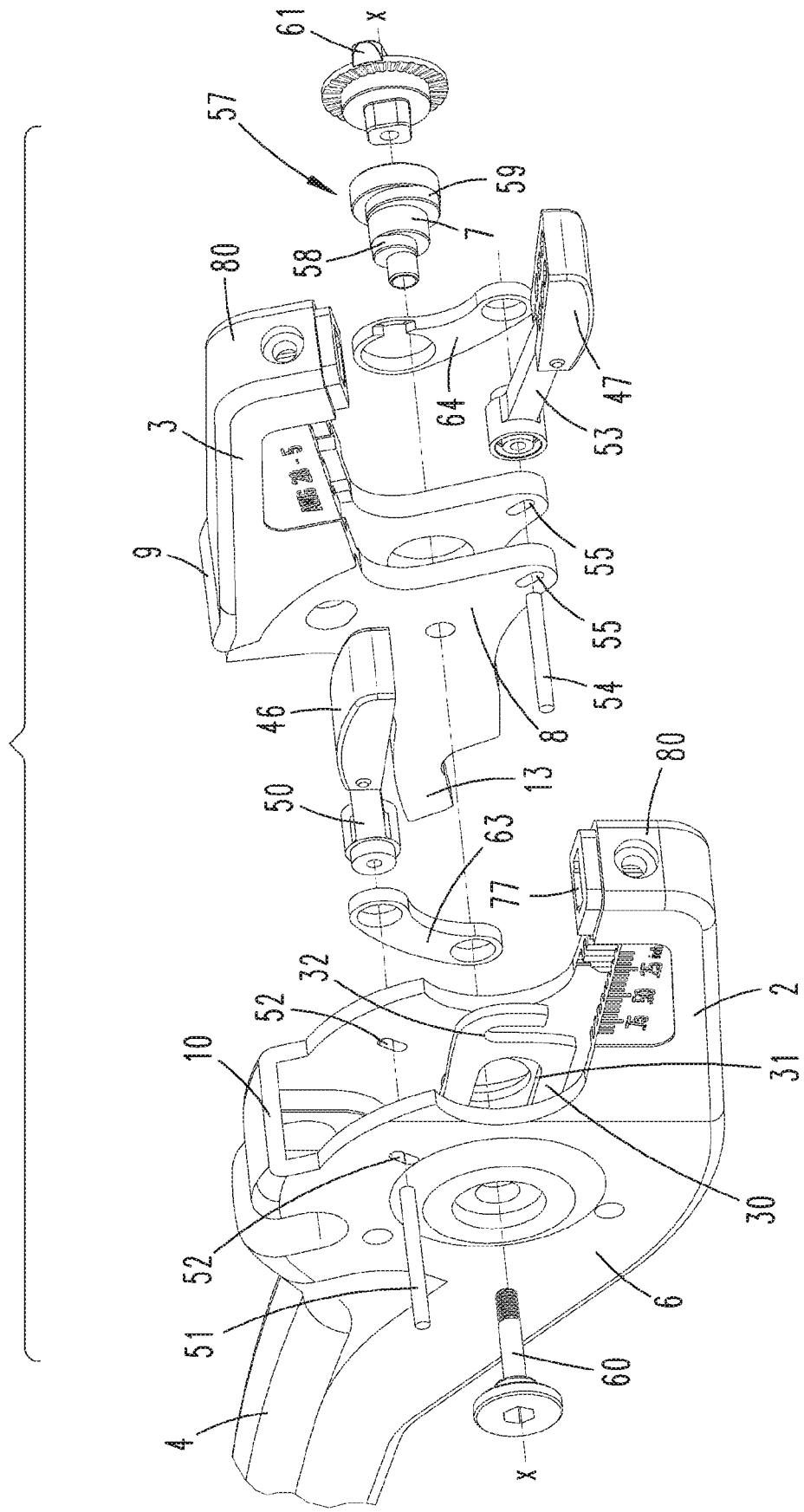
FIG. 27 show in an exploded perspective diagram the plier jaws of the stripping pliers and means for setting a cutting depth of the cutting jaws.

With reference to a basic position, for example, according to the diagram in FIG. 6, the slots 52 (see also FIG. 25) and 55 (see also FIG. 27) are aligned with reference to a projection of the same in the direction of the geometric axis of rotation x in a plane aligned perpendicular to the axis of rotation so that these substantially in each case enclose an acute angle of about 45° with respect to the direction of displacement r, wherein both slots 52 and 53 run substantially at an inclination in the direction of the axis of rotation x.

As a result of the previously described arrangement of the linkage parts 46 and 47 in cooperation with the jaw-side linkages 48 and 49, and also further as a result of the connection of the linkage parts 46 and 47 via the coupling rods 50 and 53 to a region of the substantially opposite plier jaw, in the exemplary embodiment an independent (automatic) cutting depth matching is achieved depending on the cable outer diameter.

Depending on the diameter or the thickness of the cable 21 to be grasped between the clamping jaws 19 and 20 when the handle parts 4 and 5 are suitably pressed together, different cutting depths of the blades 24 and 25 of the cutting jaws 22 and 23 are obtained since depending on the grasped cable thickness and the associated spacing of the clamping jaws 19 and 20 and via this of the plier jaws 2 and 3, a sliding displacement of the linkage parts 46 and 47 along the linkages 48, 49 takes place, consequently the support point for the cutting jaws 22 and 23 on the linkage parts 46 and 47 changes. Depending on the cable thickness, the linkage parts 46 and 47 are displaced by the same amount in or contrary to the direction of displacement r via the coupling rods 50 and 53.

The setting of the coupling depth is accomplished whereby in the course of a pressing together of the handle parts 4 and 5 and via this of the plier jaws 2 and 3 and the associated deflection of the movable plier jaw 3 about the axis of rotation 7, the lower linkage part 47 in the fixed plier jaw 2 is withdrawn slightly from the mouth tip via the coupling rod 53 connected to the movable plier jaw 3. In so doing, the linkage part 47 is displaced by an amount. As a result of this displacement, the associated cutting jaw 23 is closed by a delivery amount and at the same time the angular position of the linkage part 47 is changed.

Synchronously to this, a deflection of the movable plier jaw 3 takes place via the linkage part 46 connected via the coupling rod 50 to the fixed plier jaw 2 so that a relative movement of the linkage part 46 with respect to the associated linkage 48 takes place in the same direction as in the linkage part 47. Here also a delivery movement of the associated cutting jaw 22 perpendicular to the longitudinal displacement and the position correction of the linkage part 46 thus take place.

Figure 7:
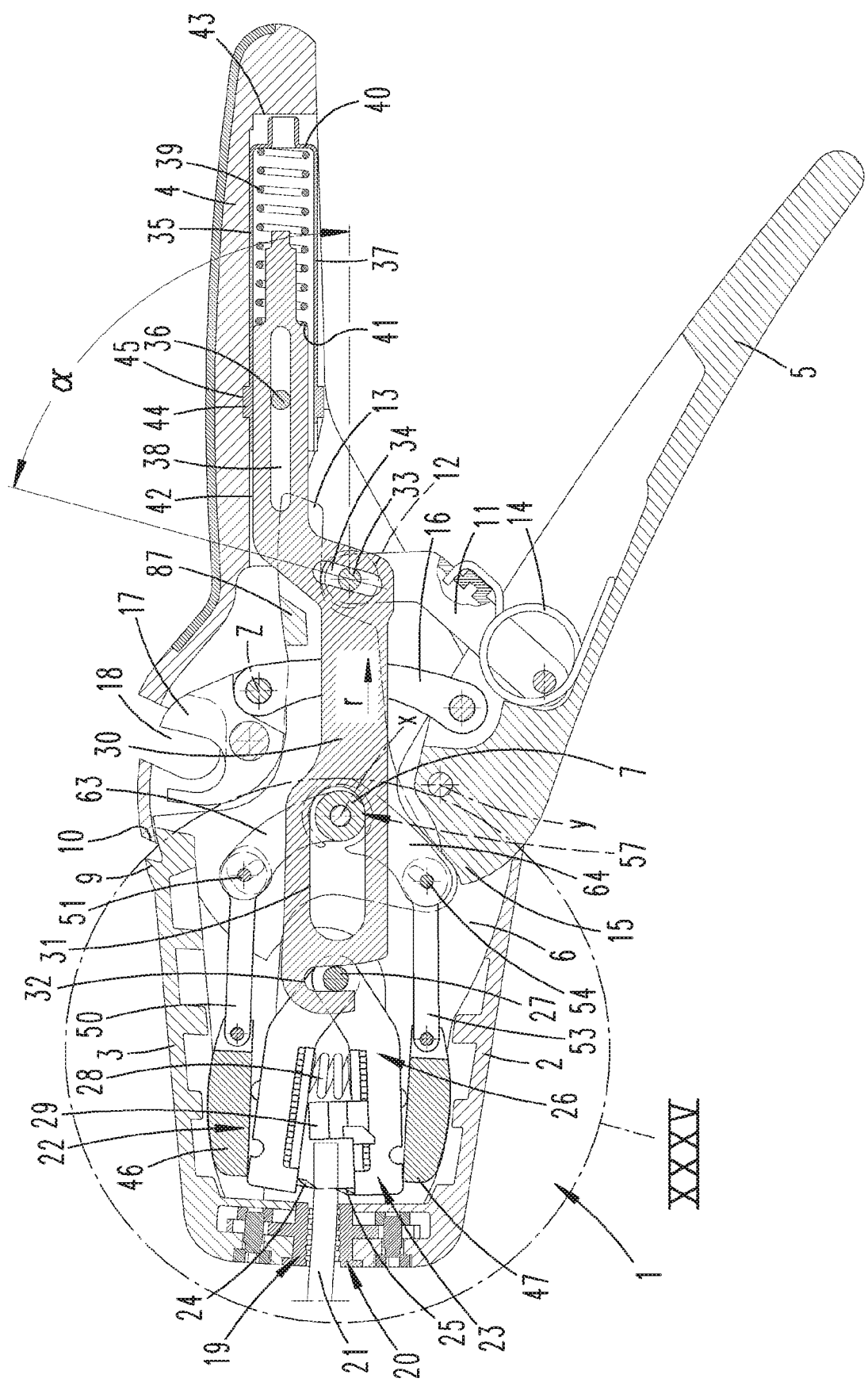
FIG. 7 shows a diagram corresponding to FIG. 6 but relating to an intermediate position in the course of the actuation.

In the course of pressing together the handle parts 4 and 5, firstly a closing of the pliers mouth M is carried out as a result of corresponding pivoting displacement of the movable plier jaw 3 with a superposed closing of the cutting jaw pair 26 (compare FIG. 7). The blades 17 of the cutting jaws 22 and 23 cut into the insulating sleeve of the cable 21, this with an incision depth which is set automatically according to the previously described configuration depending on the cable thickness.

The pivoting displacement of the movable plier jaw 3 is achieved as a result of a corresponding action of the roller 12 arranged on the control lever 11 on a facing control surface of the side arm 13 aligned in the basic position of the stripping pliers 1 approximately in the direction of displacement r.

Figure 8:
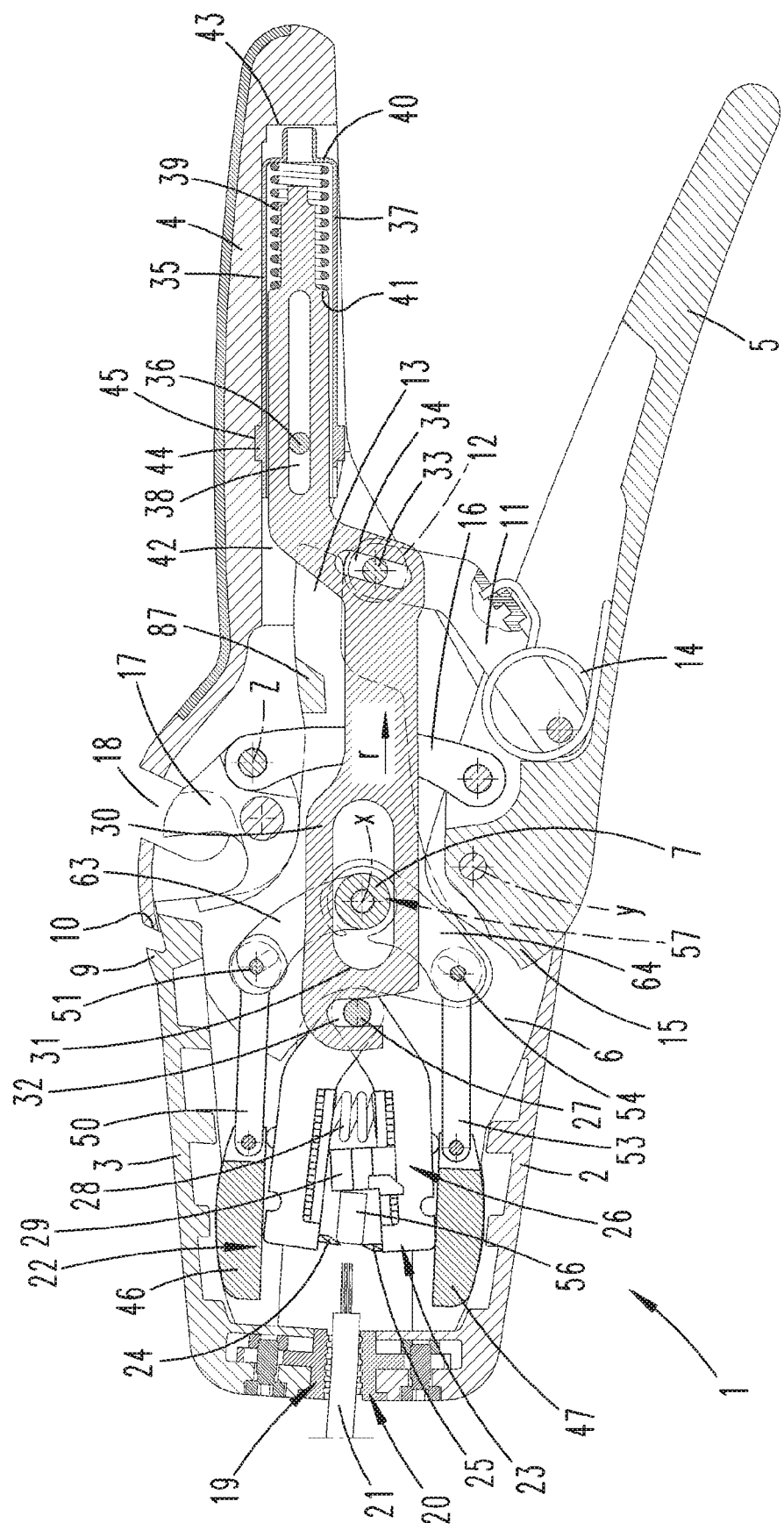
FIG. 8 shows a follow-up diagram to FIG. 7 in the course of the further actuation of the stripping pliers.

During a further pivoting movement of the movable handle part 5 in the direction of the fixed handle part 4 according to the diagram in FIG. 8, the roller 12 of the side arm 13 slides along the facing and previously described front face of the side arm 13 whilst overcoming the restoring force of the spring 39 acting in the sleeve 35 on the pull rod 30. The pull rod 30 is pulled linearly in the displacement direction r whilst entraining the cutting jaw pair 26. As a result, the insulation section 56 separated by cutting in by means of the blades 17 is stripped from the conductor.

Figure 9:
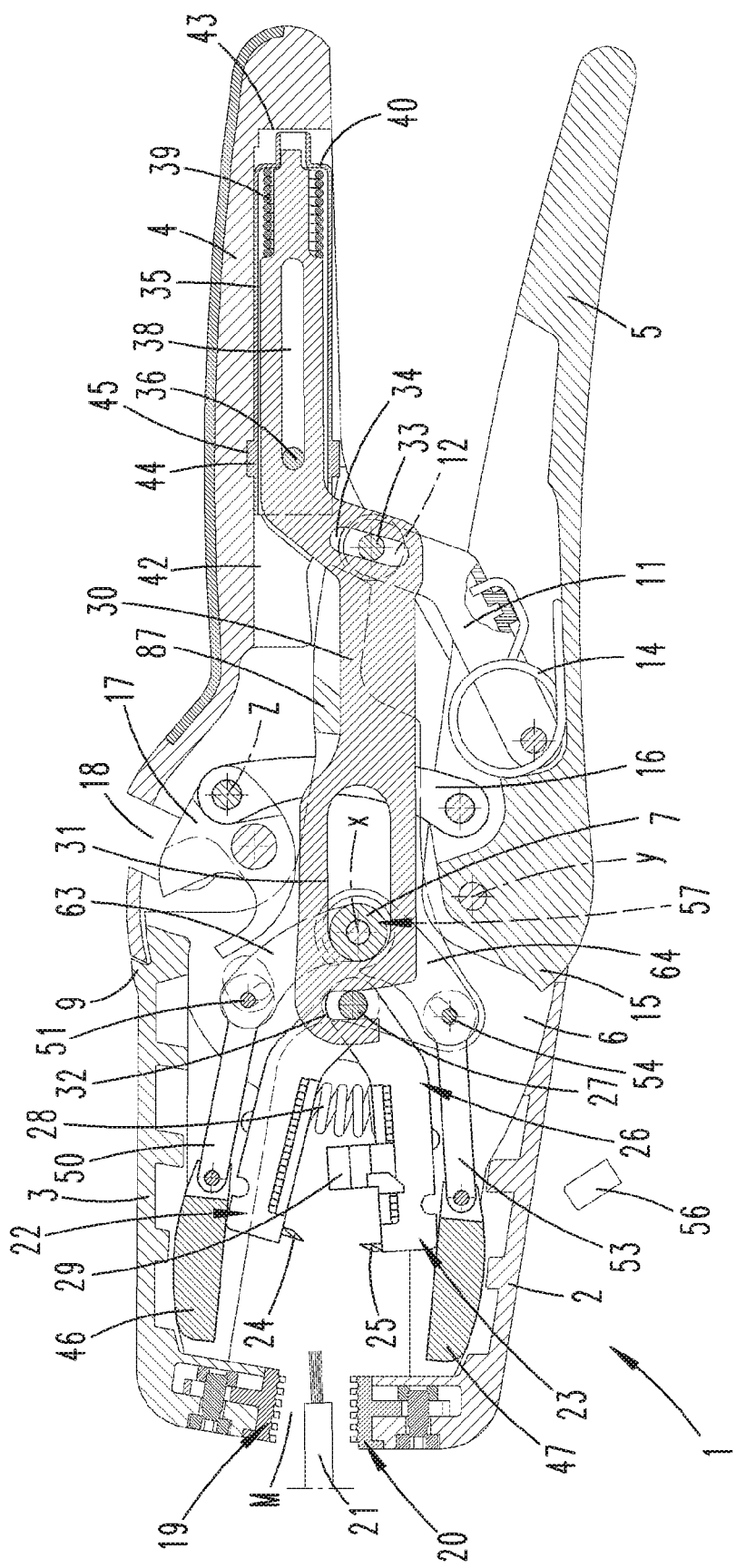
FIG. 9 shows a follow-up diagram to FIG. 8 relating to the actuation end position.

According to the diagram in FIG. 9, in the course of a further pressing together of the handle parts 4 and 5, the side-arm-side roller 12 leaves the supporting position to the side arm 13 of the movable plier jaw 3 which pivots back in the direction of its open basic position whilst simultaneously opening the pliers mouth M, and also the cutting jaw pair 26. This is caused inter alia by the restoring force of the spring 28 provided between the cutting jaws 22 and 23.

The end-side stripped cable 31 is exposed for removal from the stripping pliers 1. The separated and withdrawn insulation section 56 is exposed for removal or optionally falls independently from the pliers mouth M.

Figure 26:
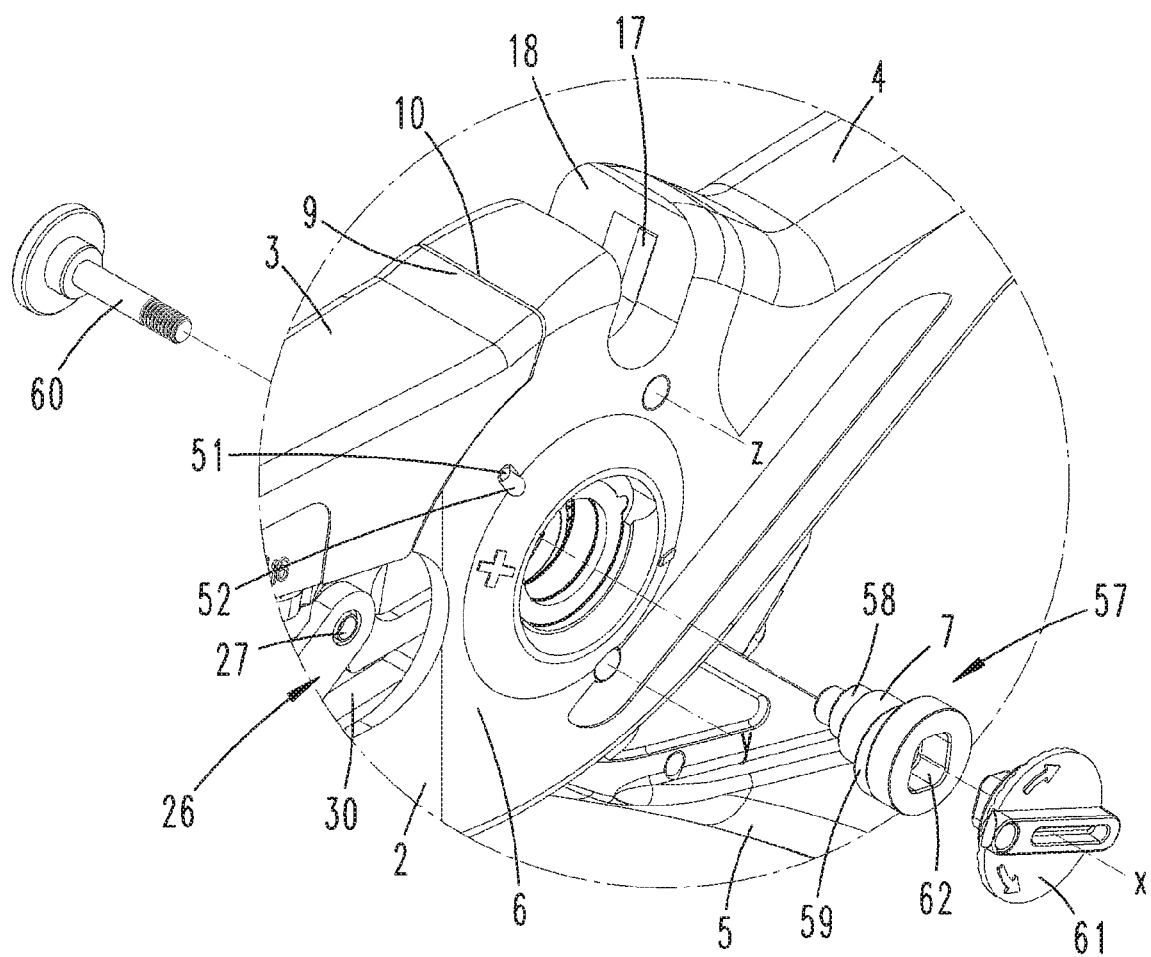
FIG. 26 shows a partial exploded perspective diagram of the region XXVI in FIG. 1.

A central adjusting means can be provided to enable an adjustment of the automatic cutting depth matching of the blades 24 and 25 of the cutting jaws 22 and 23. This can, as shown for example in FIG. 26, be an eccentric part 57 formed in one piece with two eccentrics 58 and 59 spaced apart from one another in the axial direction of the eccentric part 57. On this matter, reference is further made to FIGS. 31 to 34.

Furthermore, the eccentric part 57, as is also shown, can form the axis of rotation 7, in particular through a concentric eccentric part region which is circular in cross-section, formed between the eccentrics 58 and 59.

Figure 28:
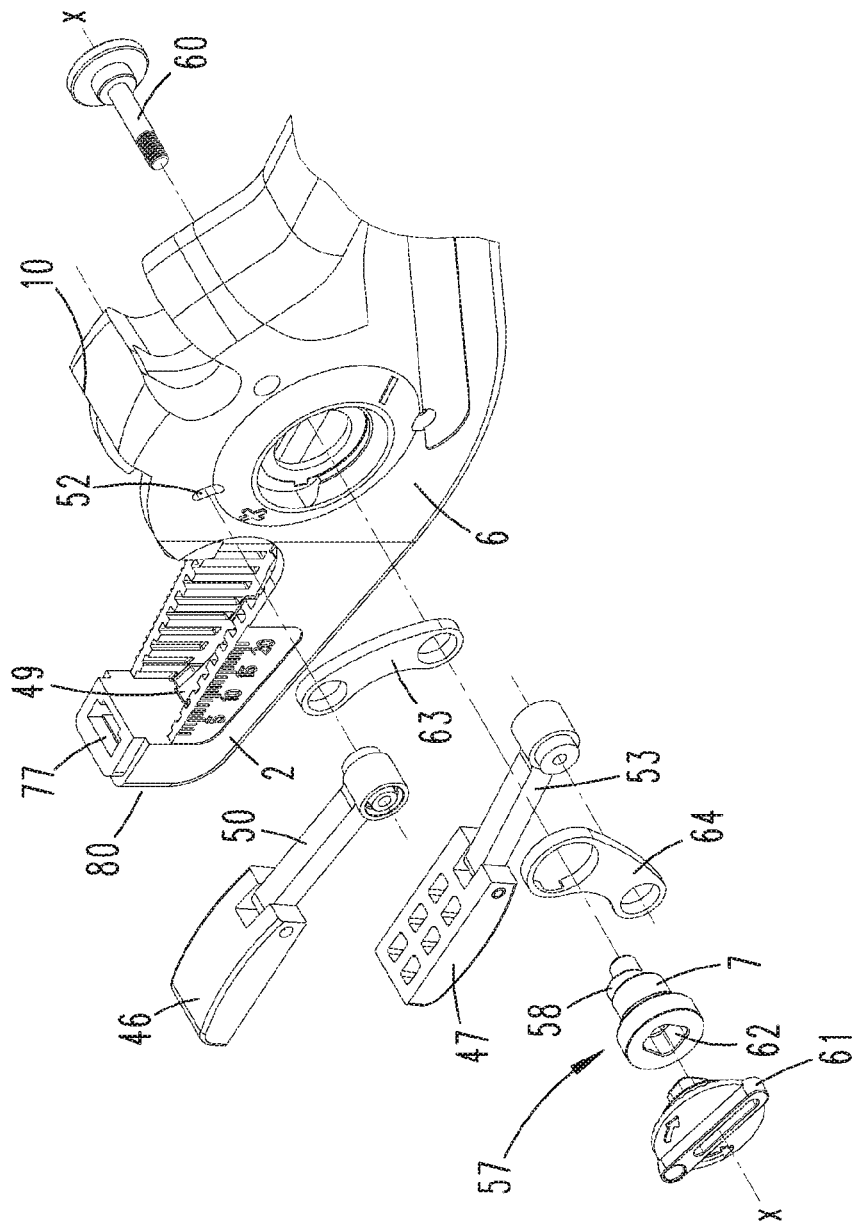
FIG. 28 shows a further perspective diagram according to FIG. 27.

The eccentric part 57, compare also FIG. 28, can be formed as a hollow-shaft type for passage through a central solid shaft. This can further be formed by a threaded bolt 60 by means of which the eccentric part 57 can be held rotatably on the cheek region 6 of the fixed plier jaw 2. The threaded bolt 60 is in this case supported at the end with a collar on the cheek side. Opposite this collar in the axial direction, a screw connection is made with a plate-shaped handle 61 accessible from outside, which engages non-rotatably in a correspondingly configured coaxial recess 62 of the eccentric part 57 with a square extension, as shown. A rotational displacement of the handle 61 about the geometric axis of rotation x accordingly results in a rotational displacement of the eccentric part 57 overall. A latching rotational displacement can be achieved.

The second eccentric 59 facing the handle 61 in relation to the central region of the eccentric part 57 forming the axis of rotation 7 can overall have a larger diameter than the section forming the axis of rotation 7, i.e. also in relation to the cam-like extension, whereas the further first eccentric 58 formed at a distance from the handle 61 can be formed with a smaller diameter with respect to the central region forming the axis of rotation 7.

Figure 30:
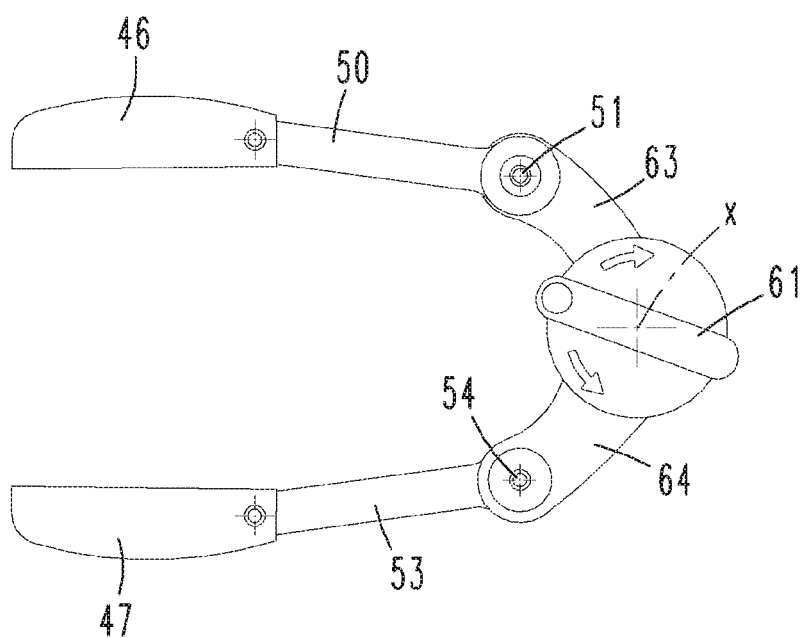
FIG. 30 shows the adjusting means arrangement in side view.
Figure 31:
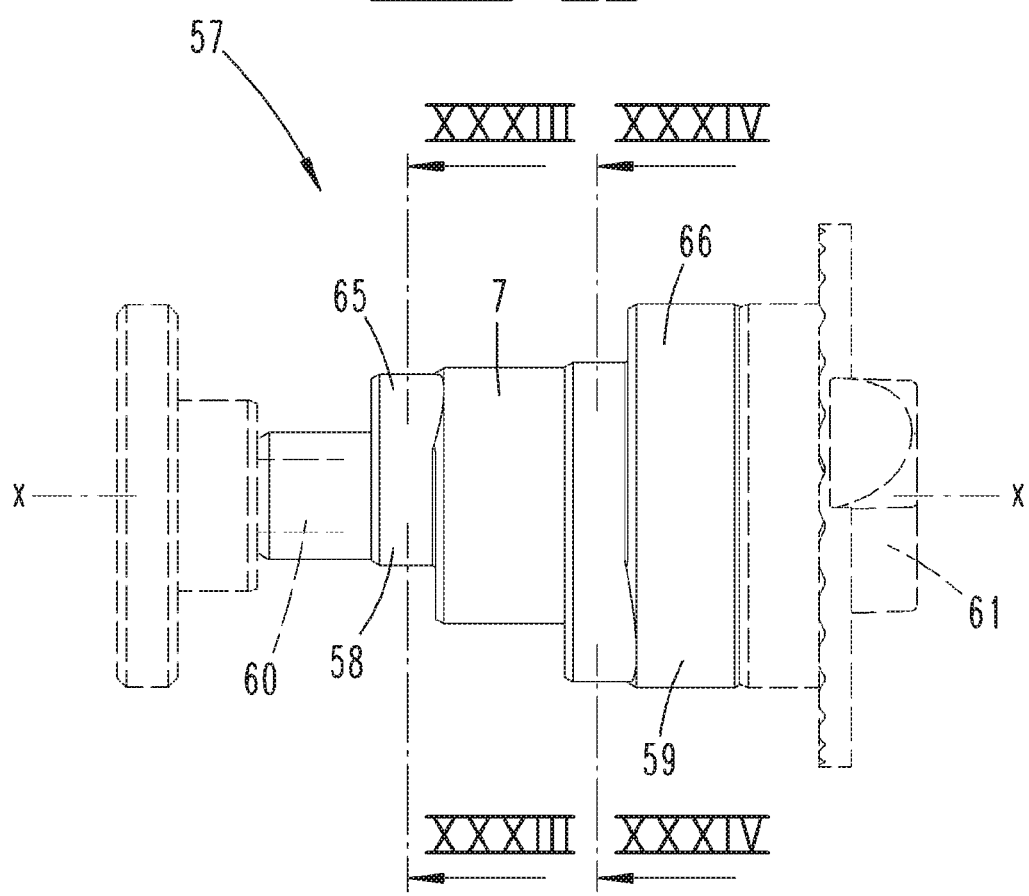
FIG. 31 shows in a side view an eccentric part of the adjusting means arrangement with a first and a second eccentric.
Figure 32:
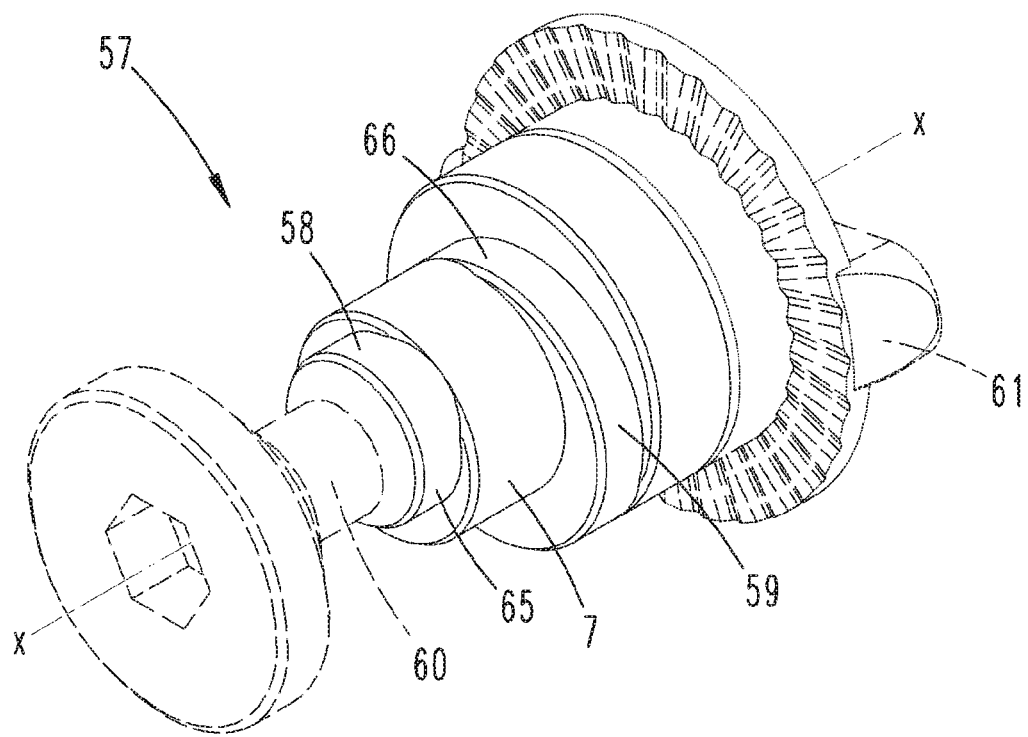
FIG. 32 shows the arrangement according to FIG. 31 in a perspective diagram.

The eccentrics 58 and 59 act via first and second guides 63, 64 on the first or second axis 51, 54 of the coupling rods 50, 53 (see FIGS. 30, 35 and 36).

The adjustment of the automatic cutting depth setting further given by this configuration is made as a result of twisting the handle 61, which via the positive connection accordingly results in a rotational displacement of the eccentrics 58 and 59, further accordingly in a displacement of the control regions 65, 66 which are eccentrically pre-curved in cross-section with respect to the geometric axis of rotation x, by the respective angular amount.

Figure 33:
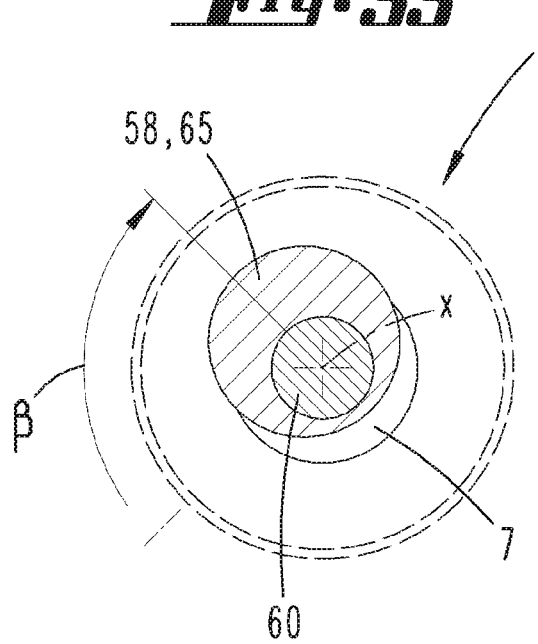
FIG. 33 shows the section according to the line XXXIII-XXXIII in FIG. 31 through the region of the first eccentric.
Figure 34:
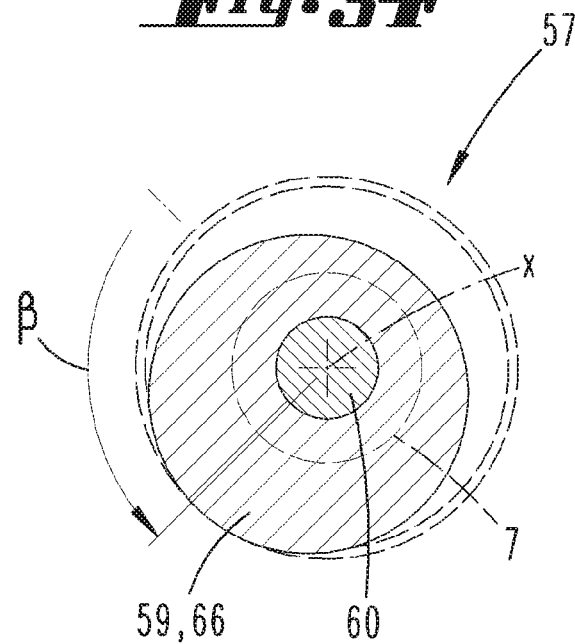
FIG. 34 shows the section according to the line XXXIV-XXXIV in FIG. 31 through the region of the second eccentric.

As can be seen from the sectional diagrams in FIGS. 33 and 34, according to the depicted exemplary embodiment the control regions 65 and 66 of the eccentrics 58 and 59 are arranged offset with respect to one another in relation to the geometric axis of rotation x by an angle β of about 90°.

As a result of twisting the handle 61 and accompanying twisting of the eccentrics 58 and 59 about the geometric axis of rotation x, a uniform and aligned displacement of the first and second axis 51, 54 of both coupling rods 50 and 53 in the associated first and second slots 52, 55 can be achieved (see arrows c). FIG. 36 shows a handle position which is twisted by 180° with respect to the position in FIG. 35. Accordingly the control regions 65 and 66 of the eccentrics 58 and 59 are twisted into an opposite position in relation to the geometric axis of rotation x with corresponding entrainment of the associated guides 63 and 64. In one possible configuration, the latter comprise the circumferential front face of the respective eccentric.

According to the example, the axes 51 and 54 are displaced by approximately half the degree of extension of the respectively assigned slot 52, 55 in the slot 52, 55 with corresponding entrainment of the coupling rods 50 and 53 connected to the axes 51 and 54 and of the linkage parts 46 and 47 provided finally.

In the case of an adjusting means arrangement thus configured, the angular position of the linkage parts 46 and 47 and the relative position of the same with respect to the respective linkage 48, 49 can be set by means of the handle 61 and accordingly via the eccentrics 58 and 59 in relation to the basic alignment in the pliers mouth open position, from which basic position a further automatic adaptation to the cable thickness can be made in the course of the usual use of the stripping pliers 1.

According to the diagrams in FIGS. 35 and 36, an exemplary adjustment of the eccentrics 58 and 59 by 180° for adjustment of the automatic cutting depth setting can enlarge an opening of the cutting jaws 22 and 23 shown in these diagrams in relation to an opening angle γ by a quarter to an eighth, further for example possibly a sixth of the angular dimension.

The relative arrangement of the first and second axis 51, 54 in the associated slots 52 and 55 is in this case independent of a pivoting position of the clamping jaws 19, 20 or the plier jaws 2 and 3.

The stripping pliers 1 can be provided with clamping jaws 19 and 20 described in detail hereinafter and/or blades 17 described in detail hereinafter.

The blades 24, 25 of the cutting jaws 22, 23 can be fixed by means of screws 67 to be operated via the front side on the respective cutting jaw 22 or 23.

For this purpose, each at least substantially plate-shaped blade 24, 24 can have a bore 68 to be traversed by the respective screw 67.

The blade 24, 25 has a blade tip 69 which in the usage state points in the direction of the pliers mouth M, having an end which runs out at an acute angle in cross-section according to the diagrams in FIGS. 21 and 22 which in a side view according to FIG. 23 forms a contour line 70. In the side view according to FIG. 23, the contour line 70 at the same time forms a terminating line of the blade 17.

The contour line 70 can have a recess 71. This appears in a central region observed in longitudinal extension of the contour line 70 as a continuously curved line (curved region 72), preferably a circular line having a radius a which is preferably adjoined on both sides whilst continuing the enclosure of an inserted cable 21 by a line or section 73 having smaller curvature. According to the depicted exemplary embodiment, this line adjoining the centrally curved line can be a straight line on both sides of the curvature so that overall a substantially V-shaped recess 71 of the contour line 70 is obtained with a correspondingly rounded V tip having the radius a.

Figure 29:
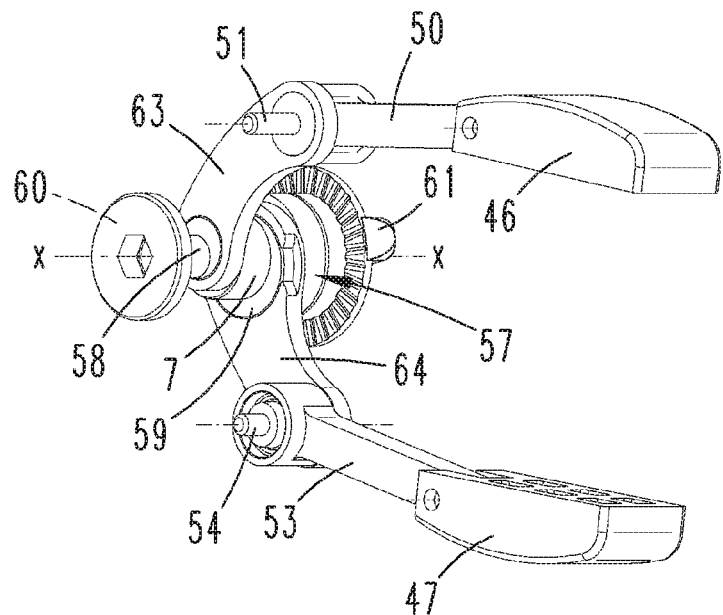
FIG. 29 shows in perspective diagram the adjusting means arrangement for setting a cutting depth of the cutting jaws.

The contour line adjoining the rounded contour in the region 72 in the section 73 can continue in the direction of the cutting direction b relative to a cutting direction b of a cutting plane E (compare FIG. 24). According to the exemplary embodiment and with reference to FIG. 29, this contour line rises upwards starting from the recess in the cutting direction b or drops downwards.

Delimiting the recess 71, the contour line 70 preferably continues on both sides of the recess 71 into straight-running sections 73, 74 which can run according to a common straight line running transversely to the cutting direction b.

Figure 11:
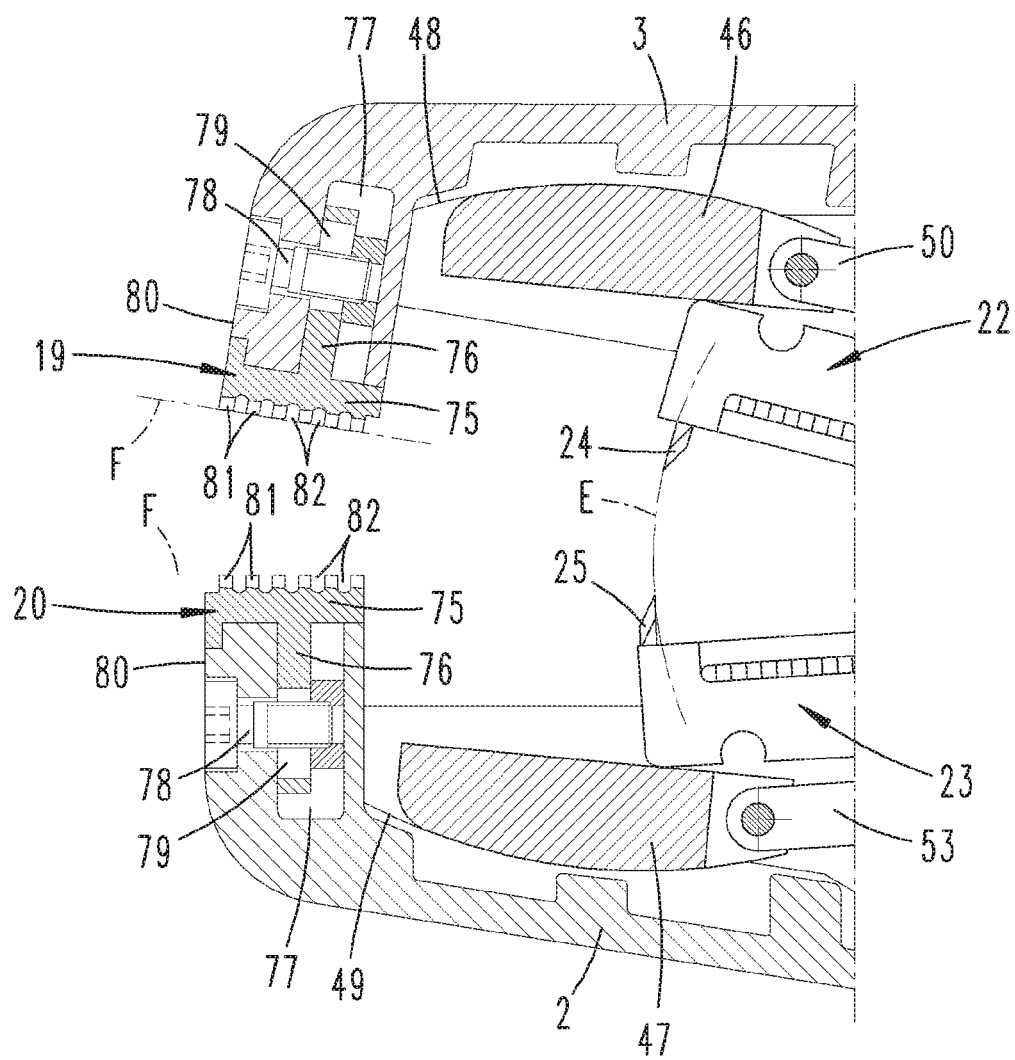
FIG. 11 shows an enlargement of the region XI in FIG. 6.

The contour line 70 continues in this case in planar extension of the cutting plane E, compare FIG. 23, which runs strictly curved, see FIGS. 3 and 11. The contour line 70 therefore also extends in width and height and preferably relatively less substantially in height than in the region of the rounded contour and relatively substantially in the width than in the region of the rounded contour.

Each clamping jaw 19 or 20 can, as shown, initially have a plate-shaped base body 75 with two opposite broad side surfaces. A fastening extension 76 projects perpendicularly from one broad side surface with an approximately central arrangement. This can be formed in a plate-like manner with a plate plane extending in the installed state transversely to an alignment of a cable 21 to be gripped between the clamping jaws 19 and 20.

By means of the fastening extension 76, it is possible to fasten the clamping jaw 19 or 20 on the associated plier jaw 2 or 3 as a result of insertion of the fastening extension 76 into a correspondingly formed receiving pocket 77 of the plier jaw 2, 3.

The fixing to the plier jaw 2, 3 is made as a result of a screw connection. To this end, the relevant fastening screw 78 passes through a corresponding bore in the plier jaw 2, 3 and a slot 79 in the fastening extension 76, wherein the screw fastening of the clamping jaw 19, 20 is made from a front face 80 of the respective plier jaw 2, 3.

Both clamping jaws 19 and 20 are provided with ribs 81 running transversely to a cable 21 to be held clamped between the clamping jaws 19 and 20 in relation to the broad sides of the base body 75 which point towards one another in the installed situation. Groove-like recesses 82 each having a recess base 83 run between these ribs 81.

According to the depicted exemplary embodiment and preferably, each clamping jaw 19, 20 can be provided with six such ribs 81, for example, which are uniformly spaced apart from one another when viewed transversely to the longitudinal extension of the ribs 81, compare also FIG. 18. Furthermore, the ribs 81 are arranged so that depending on a thickness of the cable 21 to be clamped but also without inserting the cable 21, these can be inserted in a comb-like manner into the recesses 82 of the opposite clamping jaw.

All the ribs 81 of the two clamping jaws 19 and 20 can, as shown, have a concave protuberance 84 on a part of their longitudinal extension, further preferably at the centre of their longitudinal extension. In the case of a flush arrangement of the recesses 84 when viewed preferably in a longitudinal extension of an inserted cable and when viewed over all the ribs 81, this results in a substantially central trough-shaped depression—in the sense of an envelope surface over the contour lines of the protuberances in the said longitudinal extension—in relation to the rib surface 85 pointing in the direction of the pliers mouth M. On this matter, reference is also made to FIGS. 19 and 20.

The rib surface 85 on both sides of the protuberances 84 overall spans a planar clamping surface F.

The width d of a protuberance 84 when viewed in the direction of extension of a rib 81 can approximately correspond to half the rib longitudinal extension dimension. The depth e of a protuberance 84 observed perpendicular to the width dimension d can correspond to approximately half the maximum greatest depth f of a recess 82 when viewed in the same direction.

The greatest depth f of a recess 82 in the depicted exemplary embodiment can also correspond to approximately 1.5 times the free distance g when viewed transversely to the rib longitudinal extension between two adjacent ribs 81 in the region of their rib surface 85 (compare FIG. 17).

In addition, relative to a cross-section transverse to the longitudinal extension of the rib 81, starting from the recess base 83, each rib 81 can taper conically in the direction of the rib surface 85. Thus, the rib outer surfaces delimiting the recess 82 can enclose a cone angle δ of about 15° with respect to one another.

The rib surface 85 of each rib 81 can extend with reference transversely to a longitudinal extension of the rib 81 over a partial region in a plane defining the clamping surface F, thus, for example, according to the diagram in FIG. 17 over a length h which can approximately correspond to a third of the total length k projected in the clamping surface F. The section of the rib surface 85 going beyond the length h can, according to the embodiment shown in FIG. 17, decrease at an angle ε of about 5°.

The recess base 83 can be configured to be variously deep over the length of the recess 82, accordingly to have different dimensions f. Thus, as shown, in the region of the protuberance 84 on the recess base side, a dome-like elevation 86 can be provided having a width m when viewed in the longitudinal extension of the recess 82, which can correspond to approximately a third of the total length of the recess 82 or a rib 81 and a height n above the level of the region of the recess base 83 adjoining the elevation 86, which height n can correspond to approximately a third to a fifth of the greatest depth f of the recess 82.

The arrangement and the dimensions of protuberance 84 and elevation 86 can further be selected so that even in the region of the elevation 86, the protuberance 84 does not reach the recess base 83.

The preceding explanations serve to explain the inventions covered overall by the application which also in each case further develop the prior art at least by the following feature combinations, wherein two, several or all of these feature combinations can also be combined, namely:

Stripping pliers which are characterized in that the pull rod 30 has at its handle-side end a displacement part fastened to the pull rod 30, which can be displaced against the force of the spring 39 relative to the pull rod 30 to free the pull rod 30 from a handle-side mounting.

Stripping pliers which are characterized in that the displacement part is configured as a sleeve (35).

Stripping pliers which are characterized in that the pull rod 30 freed from the handle-side mounting is pivotable about the pull pin 33 to release the cutting jaws 22, 23.

Stripping pliers which are characterized in that a longitudinal direction of the slot 34 encloses an acute angle α with a displacement direction r of the pull rod 33.

Stripping pliers which are characterized in that for the handle-side mounting of the pull rod 30 the sleeve has a latching projection 44 for engagement in a latching recess 45 formed on the handle part 4.

Stripping pliers which are characterized in that the pull rod 30 assigned to its handle-side end has a further slot 38 which is traversed by a retainer part 36 of the sleeve 35.

Stripping pliers which are characterized in that the spring 39 is supported on the one hand on the pull rod 30 and on the other hand on the sleeve 35.

Stripping pliers which are characterized in that the spring 39 is a cylinder compression spring.

Stripping pliers which are characterized in that the pull rod 30 assigned to the cutting jaws 22, 23 has an insertion opening 32 which runs substantially in the closing or opening direction of the cutting jaws 22, 23 for a pivot axis 27 of the cutting jaws 22, 23.

All the disclosed features are (for themselves and also in combination with one another) essential to the invention. The disclosure of the application herewith includes the disclosure content of the relevant/appended priority documents (copy of the prior application) in its full content, also for the purpose of incorporating features of these documents in claims of the present application. The subclaims characterize, even without the features of a claim to which reference is made, with their features independent inventive further developments of the prior art, in particular in order to make divisional applications on the basis of these claims. The invention specified in each claim can additionally have one or more of the features specified in the preceding description, in particular provided with reference numbers and/or specified in the reference list. The invention also relates to design forms in which individual ones of the features mentioned in the preceding description are not implemented, in particular insofar as they are clearly dispensable for the respective usage purpose or can be replaced by other means having technically the same effect.

REFERENCE LIST

1 Stripping pliers
2 Fixed plier jaw
3 Movable plier jaw
4 Fixed handle part
5 Movable handle part
6 Cheek region
7 Axis of rotation
8 Shoulder region
9 Projection region
10 Support surface
11 Control lever
12 Roller
13 Side arm
14 Return spring
15 Projection region
16 Guide
17 Blade
18 Free-cut region
19 Clamping jaw
20 Clamping jaw
21 Cable
22 Cutting jaw
23 Cutting jaw
24 Blade
25 Blade
26 Cutting jaw pair
27 Pivot axis
28 Spring
29 Stop slide
30 Pull rod
31 Recess
32 Insertion opening
33 Pull pin
34 Slot
35 Sleeve
36 Retainer part
37 Sleeve wall
38 Slot
39 Spring
40 Base
41 Shoulder
42 Cavity
43 Cavity base
44 Latching projection
45 Latching recess
46 Linkage part
47 Linkage part
48 Linkage
49 Linkage
50 Coupling rod
51 First axis
52 First slot
53 Coupling rod
54 Second axis
55 Second slot
56 Insulation section
57 Eccentric part
58 First eccentric
59 Second eccentric
60 Threaded bolt
61 Handle
62 Recess
63 First guide
64 Second guide
65 Control region
66 Control region
67 Screw
68 Bore
69 Blade tip
70 Contour line
71 Recess
72 Curved region 73 Section
74 Section
75 Base body
76 Fastening extension
77 Receiving pocket
78 Fastening screw
79 Slot
80 Front face
81 Rib
82 Recess
83 Recess base
84 Protuberance
85 Rib surface
86 Elevation
a Radius
b Cutting direction
c Arrow
d Width
e Depth
f Depth
g Distance
h Length
k Total length
m Width
n Height
Direction of displacement
x Geometric axis of rotation
y Geometric axis
z Geometric axis
E Cutting plane
F Clamping surface
M Pliers mouth
α Angle
β Angle
γ Opening angle
δ Cone angle
ε Angle

The invention claimed is:

1. A stripping pliers (1) having two outer clamping jaws (19, 20), two inner cutting jaws (22, 23) and two handle parts (4, 5), wherein, during pressing together the handle parts (4, 5), the two inner cutting jaws (22, 23) are configured to be displaced by a pull rod (30) from a starting position into an end position against a force of a spring (39) acting on the pull rod (30), wherein furthermore the pull rod (30) is traversed by a pull pin (33) which is configured to be moved in a slot (34), wherein at a handle-side end of the pull rod, the pull rod (30) has a displacement part slidably attached by a retainer part to the pull rod (30), and wherein the displacement part is configured to be displaced against the force of the spring (39) relative to the pull rod (30), to free the pull rod (30) from a handle-side mounting.

2. The stripping pliers according to claim 1, wherein the pull rod (30) is pivotable about a pivot pin (33) for release of the two inner cutting jaws (22, 23) when the pull rod is freed from the handle side mounting by the displacement part.

3. The stripping pliers according to claim 1, wherein a longitudinal direction of the slot (34) encloses an acute angle (α) with a displacement direction (r) of the pull rod (33).

4. The stripping pliers according to claim 1, wherein the pull rod (30) has a further slot (38) assigned to a handle-side end of the pull rod, the further slot being traversed by the retainer part (36) of the displacement part.

5. The stripping pliers according to claim 1, wherein one end of the spring (39) is supported on the pull rod (30) and another end of the spring is supported on the displacement part.

6. The stripping pliers according to claim 1, wherein the spring (39) is a cylinder compression spring.

7. The stripping pliers according to claim 1, wherein the pull rod (30) assigned to the two inner cutting jaws (22, 23) has an insertion opening (32) for a pivot pin (27) of the cutting jaws (22, 23) the insertion opening running substantially in a closing or opening direction of the two inner cutting jaws (22, 23).

8. A stripping pliers (1) having two outer clamping jaws (19, 20), two inner cutting jaws (22, 23) and two handle parts (4, 5), wherein, during pressing together the handle parts (4, 5), the two inner cutting jaws (22, 23) are configured to be displaced by a pull rod (30) from a starting position into an end position against a force of a spring (39) acting on the pull rod (30), wherein furthermore the pull rod (30) is traversed by a pull pin (33) which is configured to be moved in a slot (34), wherein at a handle-side end of the pull rod, the pull rod (30) has a displacement part attached by a retainer part (36) to the pull rod (30), and wherein the displacement part is configured to be displaced against the force of the spring (39) relative to the pull rod (30), to free the pull rod (30) from a handle-side mounting, wherein the displacement part is a sleeve (35).

9. A stripping pliers (1) having two outer clamping jaws (19, 20), two inner cutting jaws (22, 23) and two handle parts (4, 5), wherein, during pressing together the handle parts (4, 5), the two inner cutting jaws (22, 23) are configured to be displaced by a pull rod (30) from a starting position into an end position against a force of a spring (39) acting on the pull rod (30), wherein furthermore the pull rod (30) is traversed by a pull pin (33) which is configured to be moved in a slot (34), wherein at a handle-side end of the pull rod, the pull rod (30) has a displacement part attached by a retainer part to the pull rod (30), and wherein the displacement part is configured to be displaced against the force of the spring (39) relative to the pull rod (30), to free the pull rod (30) from a handle-side mounting, wherein the displacement part has a latching projection (44) for engagement in a latching recess (45) formed on one of the handle parts (4).

* * * * *